US009159105B2

(12) United States Patent
Keith et al.

(10) Patent No.: US 9,159,105 B2
(45) Date of Patent: Oct. 13, 2015

(54) REDUCING THE CARBON EMISSIONS INTENSITY OF A FUEL

(71) Applicants: David William Keith, Calgary Alberta (CA); James Rhodes, La Jolla, CA (US)

(72) Inventors: David William Keith, Calgary Alberta (CA); James Rhodes, La Jolla, CA (US)

(73) Assignee: 1234 10th Street LLC, Sammamish, WA (US)

( * ) Notice: Subject to any disclaimer, the term of this patent is extended or adjusted under 35 U.S.C. 154(b) by 169 days.

(21) Appl. No.: 14/015,323

(22) Filed: Aug. 30, 2013

(65) Prior Publication Data

US 2013/0341246 A1    Dec. 26, 2013

Related U.S. Application Data

(63) Continuation of application No. 13/600,484, filed on Aug. 31, 2012, now Pat. No. 8,574,354, which is a continuation of application No. PCT/US2012/051424, filed on Aug. 17, 2012.

(60) Provisional application No. 61/524,565, filed on Aug. 17, 2011, provisional application No. 61/618,183, filed on Mar. 30, 2012.

(51) Int. Cl.
*E21B 43/00* (2006.01)
*G06Q 50/00* (2012.01)
*E21B 43/16* (2006.01)
(Continued)

(52) U.S. Cl.
CPC ............ *G06Q 50/00* (2013.01); *E21B 41/0064* (2013.01); *E21B 43/164* (2013.01); *E21B 43/166* (2013.01); *E21B 43/168* (2013.01); *E21B 43/40* (2013.01); *C10G 2300/4043* (2013.01); *C10J 2300/0916* (2013.01); *C10J 2300/1612* (2013.01); *Y02C 10/14* (2013.01); *Y02E 50/12* (2013.01); *Y10T 137/0318* (2015.04)

(58) Field of Classification Search
CPC ..... E21B 43/00; E21B 43/122; E21B 43/164; E21B 43/166; E21B 43/168
USPC .......................................................... 166/372
See application file for complete search history.

(56) References Cited

U.S. PATENT DOCUMENTS

| | | | |
|---|---|---|---|
| 3,306,354 | A | 2/1967 | O Brien |
| 3,330,352 | A | 7/1967 | Bernard |
| 5,377,764 | A | 1/1995 | Jennings |

(Continued)

FOREIGN PATENT DOCUMENTS

| | | |
|---|---|---|
| CN | 101043929 A | 9/2007 |
| EP | 1571105 A2 | 9/2007 |

(Continued)

OTHER PUBLICATIONS

First Office Action and Search Report for Chinese Application No. 201280051043.1, dated Jan. 12, 2015, 21 pages.

(Continued)

*Primary Examiner* — Robert A Hopkins
(74) *Attorney, Agent, or Firm* — Fish & Richardson P.C.

(57) ABSTRACT

Techniques for reducing a carbon emissions intensity of a fuel includes injecting a carbon dioxide fluid into a first wellbore; producing a hydrocarbon fluid from a second wellbore to a terranean surface; and producing a fuel from the produced hydrocarbon fluid, the fuel including a low-carbon fuel and assigned an emissions credit based on a source of the carbon dioxide fluid.

41 Claims, 11 Drawing Sheets

(51) Int. Cl.
*E21B 41/00* (2006.01)
*E21B 43/40* (2006.01)

(56) References Cited

U.S. PATENT DOCUMENTS

| | | | |
|---|---|---|---|
| 6,237,339 | B1 | 5/2001 | Asen et al. |
| 7,426,489 | B2 | 9/2008 | van et al. |
| 7,440,871 | B2 | 10/2008 | McConnell et al. |
| 7,947,239 | B2 | 5/2011 | Lackner et al. |
| 8,285,635 | B2 | 10/2012 | Rhodes |
| 2006/0185560 | A1 | 8/2006 | Ramme et al. |
| 2006/0216811 | A1 | 9/2006 | Cunningham et al. |
| 2007/0261844 | A1 | 11/2007 | Cogliandro et al. |
| 2009/0266540 | A1 | 10/2009 | De |
| 2009/0326715 | A1 | 12/2009 | Liska et al. |
| 2010/0038082 | A1 | 2/2010 | Zubrin et al. |
| 2010/0064890 | A1 | 3/2010 | Keith |
| 2010/0200465 | A1 | 8/2010 | Dana et al. |
| 2012/0330726 | A1 | 12/2012 | Rhodes |

FOREIGN PATENT DOCUMENTS

| | | |
|---|---|---|
| FR | 2929007 A1 | 9/2009 |
| JP | 2005165469 A | 6/2005 |
| KR | 2007053767 A | 5/2007 |
| WO | WO2008017413 A1 | 2/2008 |

OTHER PUBLICATIONS

Authorized officer Nora Linder, International Preliminary Report on Patentabilty for International Application No. PCT/US2012/051424, mailed Feb. 27, 2014, 10 pages.

International Search Report and Written Opinion for International Application No. PCT/US2012/051424, mailed Feb. 20, 2013, 14 pages.

Paulina Jaramillo, et al., "Life Cycle Inventory of CO2 in an Enhanced Oil Recovery System," Environ. Sci. Technol., 2009, vol. 43, pp. 8027-8032.

Heselius, Per, Supplementary Partial European Search Report for European Application No. 12824317.7, Jun. 5, 2015, 6 pages.

REDUCING THE CARBON EMISSIONS INTENSITY OF A FUEL

CROSS-REFERENCE TO RELATED APPLICATIONS

This application is a continuation of, and claims priority under 35 U.S.C. §120 to, U.S. patent application Ser. No. 13/600,484, entitled "REDUCING THE CARBON EMISSIONS INTENSITY OF A FUEL," filed Aug. 31, 2012, now U.S. Pat. No. 8,574,354 which in turn is a continuation of, and claims priority under 35 U.S.C. §120 to, International Application No. PCT/US2012/051424, filed Aug. 17, 2012, which in turn claims priority to U.S. Provisional Patent Application Ser. No. 61/524,565, entitled "LOW-CARBON INTENSITY PRODUCTION OF HYDROCARBON FUELS," filed Aug. 17, 2011, and to U.S. Provisional Patent Application Ser. No. 61/618,183, entitled "LOW-CARBON INTENSITY PRODUCTION OF HYDROCARBON FUELS," filed Mar. 30, 2012. The entire contents of all of the previous applications are incorporated by reference as if fully set forth herein.

TECHNICAL BACKGROUND

This disclosure relates to the production and/or supply of hydrocarbon products with low life-cycle emissions of greenhouse gases per unit fuel, referred to as low carbon intensity.

BACKGROUND

The burning of a hydrocarbon product (e.g., a hydrocarbon that has been refined into, for example, a transportation fuel, chemical, plastic, or otherwise), such as gasoline, produces emissions, such as, for example, carbon dioxide, carbon monoxide, sulfur dioxide, and other substances, many of which are often referred to as "greenhouse gases." For example, it can be determined how much greenhouse gas (e.g., in grams of carbon dioxide equivalent emissions) is emitted by the burning of a particular amount of gasoline (e.g., in units of grams carbon dioxide equivalent emissions per mega-joule of fuel energy). In many contexts it is useful to determine the life-cycle greenhouse gas emissions from burning a particular quantity of fuel considering all emissions sources associated with the fuel's production, supply, and use, not only emissions resulting at the point of combustion. Lifecycle analysis (LCA) provides an analytic framework for such emissions determinations. The result for a particular fuel is often referred to as the fuel's lifecycle global warming intensity (GWI), carbon dioxide emission intensity, or simply carbon intensity (CI), and may be used as a fuel-specific measure of air pollutant or greenhouse gas emissions on a lifecycle basis based on the amount of hydrocarbons or hydrocarbon products (e.g., transportation fuels, such as gasoline) burned, or combusted. In the context of determining fuel CI, lifecycle analysis can be conceptualized as a system of accounting for GHG flows to and from the atmosphere over the fuel's lifecycle, wherein flows to the atmosphere can represent emissions debits and GHG flows from the atmosphere (e.g., via industrial process for direct air capture or via biological fixation during photosynthesis) and emissions reductions from supplying co-products can represent emissions credits.

SUMMARY

In one general implementation, a method for reducing a carbon emissions intensity of a fuel includes injecting a carbon dioxide fluid into a first wellbore; producing a hydrocarbon fluid from a second wellbore to a terranean surface; and producing a fuel from the produced hydrocarbon fluid, the fuel including a low-carbon fuel and assigned an emissions credit based on a source of the carbon dioxide fluid.

In another general implementations, a method for reducing a carbon emissions intensity of a fuel includes capturing a carbon dioxide fluid from a source of carbon dioxide; and providing the captured carbon dioxide fluid to a process for generating a low-carbon fuel that is assigned an emissions credit based on the source of the carbon dioxide fluid.

In another general implementation, a method for reducing a carbon emissions intensity of a fuel includes receiving a fuel refined from a raw hydrocarbon fluid produced from a geologic formation into which captured carbon dioxide fluid was injected; and providing the fuel as a low-carbon fuel that is assigned an emissions credit based on a source of the captured carbon dioxide fluid.

In another general implementation, a method of producing a hydrocarbon fuel with low life cycle carbon intensity includes receiving a hydrocarbon fluid that has been produced from a geologic formation through a wellbore to a terranean surface, the hydrocarbon fluid produced, at least partially, from the geologic formation with a carbon dioxide fluid injected into the geologic formation; and refining the received hydrocarbon fluid into a low-carbon fuel that is assigned an emissions credit based on a source of the carbon dioxide fluid injected into the geologic formation.

In a first aspect combinable with any of the general implementations, the source of the carbon dioxide fluid includes atmospheric carbon dioxide supplied by at least one of an industrial process that captures carbon dioxide from the atmosphere; or a biomass carbon dioxide source including carbon fixed from the atmosphere by photosynthesis.

In a second aspect combinable with any of the previous aspects, wherein the industrial process includes directing ambient air through a packing material; flowing a carbon dioxide absorbing fluid over the packing material; capturing the atmospheric carbon dioxide in the carbon dioxide absorbing fluid; separating the captured atmospheric carbon dioxide from the carbon dioxide absorbing fluid.

A third aspect combinable with any of the previous aspects further includes receiving the captured atmospheric carbon dioxide; and using the received captured atmospheric carbon dioxide as the injected carbon dioxide fluid into the first wellbore.

In a fourth aspect combinable with any of the previous aspects, the biomass carbon dioxide source includes one of a biological processing that receives biomass as an input and outputs the carbon dioxide fluid and a liquid fuel or chemical product; a process that includes gasification and receives biomass as an input and outputs the carbon dioxide fluid and a hydrogen-containing product or intermediary product; a combustion process including post-combustion carbon capture that receives biomass as an input and outputs the carbon dioxide fluid and at least one of electricity, heat, or power; or an oxyfuel combustion process that receives biomass as an input and outputs the carbon dioxide fluid and at least one of electricity, heat, or power.

In a fifth aspect combinable with any of the previous aspects, the source of the carbon dioxide fluid is an industrial process that supplies one or more products and services, and the industrial process provides a basis for at least one of a carbon intensity reductions or an emissions credit for at least one of the produced hydrocarbon fluid or the fuel produced from the produced hydrocarbon fluid.

In a sixth aspect combinable with any of the previous aspects, the first and second wellbores are the same wellbore.

A seventh aspect combinable with any of the previous aspects further includes receiving at least a portion of the injected carbon dioxide fluid from the first wellbore at the terranean surface within the hydrocarbon fluid; separating the portion of the injected carbon dioxide fluid from the hydrocarbon fluid; and re-injecting the separated portion of the injected carbon dioxide fluid into the first wellbore.

An eighth aspect combinable with any of the previous aspects further includes sequestering at least a portion of the injected carbon dioxide fluid in a subterranean zone.

In a ninth aspect combinable with any of the previous aspects, the low-carbon fuel includes a low-carbon transportation fuel.

In a tenth aspect combinable with any of the previous aspects, the industrial process includes capturing carbon dioxide from ambient air in a fluid.

In an eleventh aspect combinable with any of the previous aspects, the fluid is a carbon dioxide absorbing liquid, and capturing carbon dioxide from ambient air in a fluid includes directing ambient air through a packing material; flowing the carbon dioxide absorbing fluid over the packing material; capturing the atmospheric carbon dioxide in the carbon dioxide absorbing fluid; separating the captured atmospheric carbon dioxide from the carbon dioxide absorbing fluid.

In a twelfth aspect combinable with any of the previous aspects, the low-carbon fuel includes a low-carbon transportation fuel.

A thirteenth aspect combinable with any of the previous aspects further including completing a transaction to effect at least one of selling the low-carbon fuel to a transportation fuel provider; selling the emissions credit associated with the carbon intensity reduction to a transportation fuel provider or credit trading entity; or submitting the credit to a regulatory agency responsible for regulating fuel carbon intensity.

In a fourteenth aspect combinable with any of the previous aspects, the low-carbon fuel includes a low-carbon consumer transportation fuel.

In a fifteenth aspect combinable with any of the previous aspects, the source of the carbon dioxide fluid is an industrial process that supplies other products and services, and atmospheric emissions from the industrial process are reduced by the capture of carbon dioxide fluid for hydrocarbon production, where the reduction provides a basis for the carbon intensity reduction or emissions credits applied to the produced hydrocarbon fluid or the fuel produced from the produced hydrocarbon fluid.

In a sixteenth aspect combinable with any of the previous aspects, the source of the carbon dioxide fluid is an industrial process that supplies other products and services, and the total atmospheric emissions from supplying those products and services and from supplying the produced hydrocarbon fluid or fuel produced from the produced hydrocarbon fluid is reduced in part by injecting the carbon dioxide fluid into a wellbore, and this reduction provides a basis for the carbon intensity reduction or emissions credits applied to the produced hydrocarbon fluid or the fuel produced from the produced hydrocarbon fluid.

Other implementations may also include one or more computer-implemented methods performed by a system of one or more computers. For example, a general implementation of a computer-implemented method for determining at least one of an emissions intensity value or an emissions credit value for a hydrocarbon-based fuel includes: determining emissions values for carbon dioxide supply, transportation, hydrocarbon fluid recovery, hydrocarbon fluid transport, hydrocarbon fluid refining, and refined hydrocarbon fluid transportation and storage; and determining at least one of an emissions intensity value or an emissions credit value for the hydrocarbon fluid and or refined hydrocarbon fuel based in part on the determined emissions value for the source of carbon dioxide fluid supplied for hydrocarbon production.

Various implementations of a system for producing and/or supplying a low-carbon transportation fuel according to the present disclosure may include one or more of the following features and/or advantages. For example, the system may allow a hydrocarbon product (e.g., fuel) provider to meet a low-carbon fuel standard within a regulatory scheme directed at transportation fuels. The system may enable a fuel provider to achieve a particular fuel CI target or a particular reduction in fuel CI required to access certain fuel markets. Further, the system may help reduce greenhouse gasses being emitted to the atmosphere, such as, for example, carbon dioxide. The system may also allow a fuel provider that is a carbon "debtor" (e.g., provide a transportation fuel that does not meet a minimum standard) in a regulatory scheme to more efficiently buy carbon credits from a fuel provider that is a carbon "creditor" (e.g., provide a transportation fuel that meets or exceeds a minimum standard) in the scheme. The system may also provide fuel providers that are carbon debtors to lower a CI of their transportation fuels, potentially becoming carbon "creditors" or reducing the quantity of credits required to be acquired from carbon "creditors" to achieve compliance, without altering the chemical composition of their transportation fuels. Further advantages may include, for example, reducing anthropogenic GHG emissions from the production and use of hydrocarbon fuels and/or engineering carbon flows to and from the atmosphere and/or geologic formations associated with the production and use of hydrocarbons.

Further, a system for producing and/or supplying a low-carbon transportation fuel according to the present disclosure may reduce the cost of mitigating GHG emissions from anthropogenic activities reliant upon hydrocarbon fuels. A system for producing and/or supplying a low-carbon transportation fuel according to the present disclosure may also enable hydrocarbon fuel providers to generate emissions credits to comply with regulations requiring fuel CI reductions at potentially reduced cost (e.g., without needing to purchase emissions credits from other suppliers). A system for producing and/or supplying a low-carbon transportation fuel according to the present disclosure may also enable hydrocarbon fuel providers to generate emissions credits to balance an increasing supply of high CI fuels under regulations requiring reductions in average fuel CI. A system for producing and/or supplying a low-carbon transportation fuel according to the present disclosure may also enable hydrocarbon fuel providers to generate emissions credits for banking &/or sale to other regulated fuel suppliers. It may also enable suppliers of hydrocarbon products to qualify fuels for sale in markets with mandated CI threshold values or threshold CI reduction values.

These general and specific aspects may be implemented using a device, system or method, or any combinations of devices, systems, or methods, including computer-implemented methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and drawings, and from the claims.

DETAILED DESCRIPTION

Figure 1:
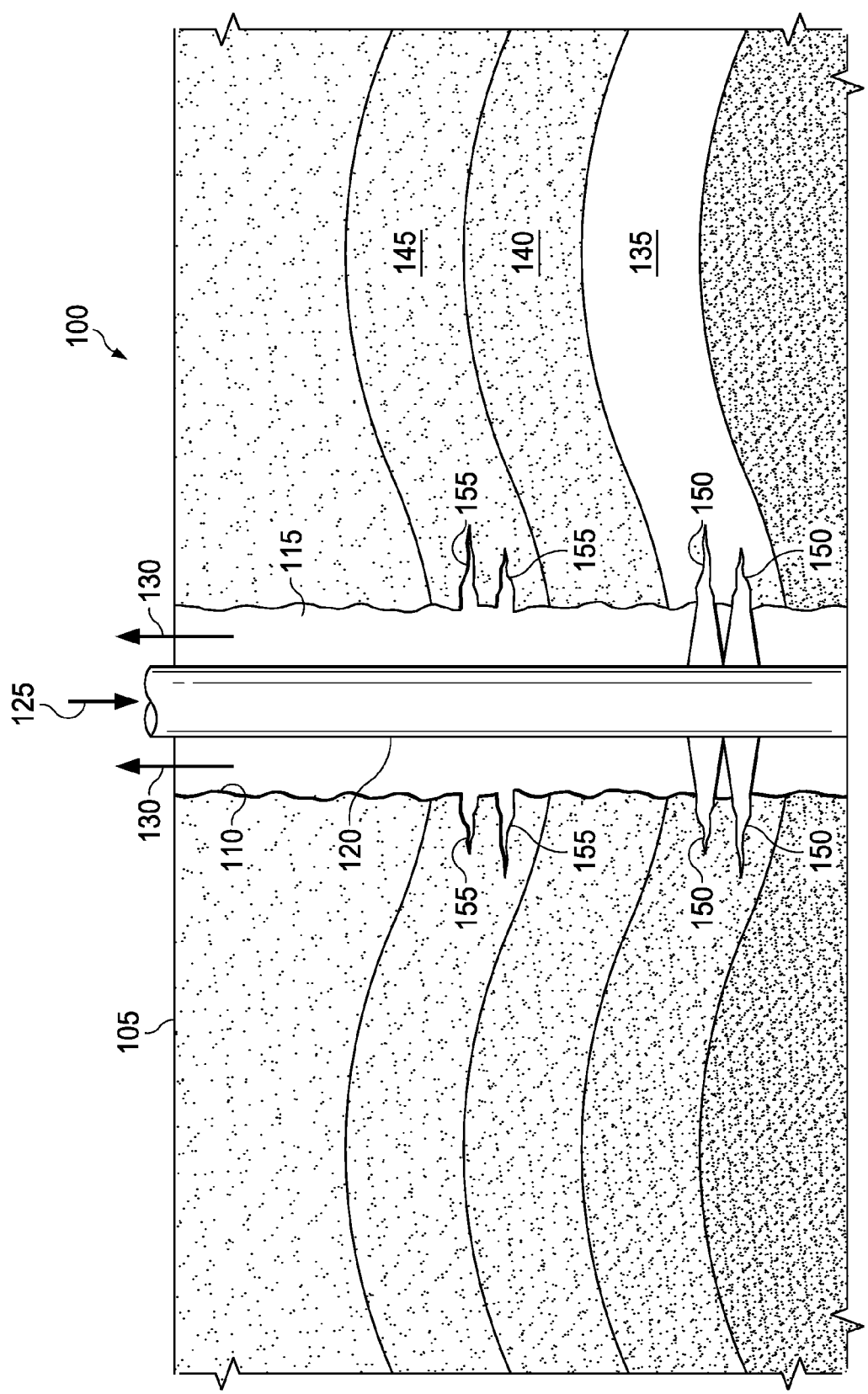
FIG. 1 illustrates an example embodiment of a system for producing (e.g., from a wellbore) a low-carbon hydrocarbon according to the present disclosure.

The present disclosure describes techniques for producing hydrocarbons (e.g., a raw material recovered from a subterranean formation) and/or hydrocarbon products (e.g., fuel) with low life cycle greenhouse gas emissions that include injecting a carbon dioxide fluid into one or more wellbores, producing a hydrocarbon from one or more wellbores to a terranean surface, and supplying a low-carbon transportation fuel from the produced hydrocarbon fluid. Additional techniques include capturing carbon dioxide; and providing the captured carbon dioxide to a process for generating a transportation fuel including a low-carbon fuel. Additional techniques include injecting a carbon dioxide fluid containing carbon dioxide derived from an atmospheric source into a subterranean zone; and producing a hydrocarbon fluid from the subterranean zone. Additional techniques include receiving a fuel refined from a raw hydrocarbon fluid produced from a geologic formation into which captured carbon dioxide was injected; and providing the fuel as a transportation fuel having a carbon emissions accounting credit based at least in part on a fuel pathway that includes the injection of the captured carbon dioxide.

Such techniques may also be used to compare the environmental impact of different fuels, for example, such as different grades and/or compositions of gasoline or other types of transportation fuels (e.g., biofuels, natural gas, hydrogen, fuel electricity), or to compare the impact of similar fuels produced from different feedstock or produced and supplied via different supply chains. Fuel supply chains can be organized for the purposes of determining and/or reporting fuel CI into discrete "fuel pathways." Fuel pathways may be specific to individual supply chains or may represent broad categories of supply chains. The specific logistical means by which a fuel is supplied to a particular market can be described, characterized, and/or summarized to define the fuel's "physical pathway."

Transportation fuels may be viewed based on their particular CI within certain regulatory schemes, for example, schemes that define emissions intensity values or threshold emission intensity reductions required to access certain fuel markets or to qualify fuels within certain regulatory fuel categories. Fuels may also be viewed based on their relative CI within a regulatory scheme (apart from the physical process of carbon dioxide emissions). For example, some fuels, such as ethanol, may have a relatively low CI within a regulatory scheme, for example, a scheme that facilitates the purchase and/or sale of carbon credits by entities regulated to meet certain standards. Other transportation fuels, such as diesel, may have a relatively high CI.

As noted above, although chemical content affects a particular transportation fuel's carbon dioxide emissions intensity value, other factors may also affect this value. For example, particular life-cycle emissions from producing a raw hydrocarbon that is eventually refined and/or otherwise processed into a particular fuel, including a transportation fuel, may affect the carbon dioxide emissions intensity value of the transportation fuel. Further, refining techniques to process the raw hydrocarbon into hydrocarbon products, for example, a transportation fuel, (if necessary) may affect the CI.

Also, mode(s) and distance of transporting the raw hydrocarbons, blendstock, and/or finished fuel within the supply chain or fuel pathway (e.g., from production site to user of the transportation fuel), such as by pipeline, truck, or other means, may also affect the CI. For example, in accounting for carbon flows and determining a regulatory value of a hydrocarbon fuel in a conventional scheme, CI values (e.g., in $gCO_2e/MJ$) may include values assigned for both a "well-to-tank" path (e.g., fuel production and supply to vehicles) and a "tank-to-wheel" path (e.g., fuel combustion within vehicles). The well-to-tank path includes, for example, CI values assigned for crude (e.g., raw hydrocarbon) production, crude transport, crude refining, and refined fuel transport. The tank-to-wheel path may include, for example, CI values assigned to represent GHG generated in burning a mega joule (MJ) of refined fuel (e.g., gasoline). In one example accounting, approximate CI values (in $gCO_2e/MJ$) for the well-to-tank path include: 6.9 for crude production, 1.1 for crude transport, 13.7 for crude refining, and 0.4 for refined fuel transport. Thus, the total well-to-tank CI value is approximately 22.2. The approximate CI value for the tank-to-wheel path may be 72.9. Accordingly, the total "well-to-wheel" regulatory CI value in this example for a hydrocarbon fuel in a conventional fuel pathway is approximately 95 $gCO_2e/MJ$.

FIG. 1 illustrates an example embodiment of a system 100 for producing hydrocarbons with low life cycle greenhouse gas emissions. As illustrated, system 100 includes a wellbore 110 formed from a terranean surface 105 for producing a production fluid 130 from one or more subterranean zones 135, 140, and/or 145. Typically, production fluid 130 is a raw hydrocarbon, such as oil, natural gas, or other hydrocarbon that may need further refinement and/or processing to form a hydrocarbon product, for example, a hydrocarbon transportation fuel (e.g., a hydrocarbon-based product used as a fuel for transporting living creatures and/or product on a terranean surface). For instance, production fluid 130 may be oil that is further refined to gasoline used as a fuel for automobiles. Alternatively, production fluid 130 may be a low CI hydrocarbon, such as, for example, a raw hydrocarbon that need not be further refined to have a low CI.

As illustrated, the system 100 also includes a tubing 120 extending from at or near the terranean surface 105 into the wellbore 110 to form an annulus 115 between the tubing 120 and a wall of the wellbore 110. The tubing 120 may be any appropriate tubular, such as threaded pipe or other tubular designed to be inserted into a wellbore, including vertical, near-vertical, horizontal, articulated, radiussed, directional, or other type of wellbore. Indeed, although FIG. 1 illustrates the wellbore 110 as a vertical bore, wellbore 110 may be directional, horizontal, articulated, or otherwise. For simplicity, drilling and/or production equipment known in the art to form wellbores and/or produce fluids from wellbores are omitted from FIG. 1. However, those of skill in the drilling and/or production arts will recognize the necessary equipment, apparatus, and processes to form wellbore 110 and produce production fluid 130 from the wellbore 110 to the terranean surface 105 that may not be shown in FIG. 1.

As illustrated, an injection fluid 125 is provided into the wellbore 110 (or the tubing 120) from the terranean surface 105. According to the present disclosure, the injection fluid 125 may be, for example, a greenhouse gas (in gaseous form, liquid form, or as a multiphase fluid). For example, in one embodiment, injection fluid 125 may be carbon dioxide and, more particularly, atmospheric carbon dioxide captured directly via an industrial process (e.g., capturing from an industrial process output, such as a fossil fuel power plant, capturing via atmospheric "scrubbing," and/or otherwise), captured indirectly via biological fixation of atmospheric carbon dioxide by photosynthesis followed by other industrial processes (e.g., oxidation of associated biomass carbon and capture of resulting carbon dioxide), a combination thereof, or any other process in which carbon dioxide is captured from the atmosphere and/or from processes that would emit GHGs to the atmosphere and/or stored for later use. For instance, some specific examples of carbon dioxide captured via an atmospheric process (or processes) are described with reference to FIGS. 2A-2C.

In some embodiments, "atmospheric carbon dioxide" may refer to carbon dioxide in which the carbon content was resident in the atmosphere within the last century. For example, "atmospheric carbon dioxide" may refer to carbon dioxide resident in the atmosphere due to fossil fuel combustion plus carbon dioxide from biogenic sources may be resident in the atmosphere for approximately a century. Alternatively, "atmospheric carbon dioxide" may refer to carbon dioxide captured from the atmosphere using industrial processes; carbon dioxide captured from the atmosphere via a biological process (e.g., photosynthesis) and followed by an industrial process; and/or carbon dioxide produced from fossil fuels through industrial processes that is captured specifically to avoid it's emission to the atmosphere.

The injection fluid 125 may be provided into the subterranean zones 135 and/or 145 for a variety of purposes through one or more pathways 150 and/or 155. The pathways 150 and/or 155 may be, for example, perforations made in the wellbore 110 (e.g., through casing(s), tubulars, and/or geologic formations) and/or fractures (e.g., through casing(s), tubulars, and/or geologic formations). Further, the production fluid 130 may be produced into the annulus 115 (or a tubular) through the pathways 150 and/or 155.

In some aspects of the system 100, the injection fluid 125 (e.g., carbon dioxide) may be used in an enhanced oil recovery operation (or other tertiary recovery technique) to further produce the production fluids 130 from the subterranean zones 135, 140, and/or 145. For instance, in some aspects, the enhanced oil recovery may be a gas reinjection in which carbon dioxide is injected into one or more of the subterranean zones 135, 140, and/or 145 in order to, for example, increase a pressure within the zones and/or reduce a viscosity of the production fluid 130 contained in the zones. In some embodiments, hydrocarbon displacement by carbon dioxide injection may cause oil swelling and/or viscosity reduction (e.g., depending on, for instance, zone temperature, pressure, and hydrocarbon composition).

In some aspects of the system 100, a system of wellbores may be used in which the wellbore(s) from which hydrocarbons are produced may be different from the wellbore(s) into which the injection fluid is injected. In these aspects, the fluid injection wellbores and hydrocarbon producing wellbores would be connected by subterranean zones (e.g., zones 135, 140, and/or 145) or systems of subterranean zones containing the hydrocarbons to be produced.

While carbon dioxide injection (e.g., carbon dioxide flooding) may provide for a use for captured carbon dioxide as the injection fluid 125 (thereby decreasing greenhouse gases in the atmosphere), the carbon dioxide injected into the zones 135, 140, and 145 may return with the production fluid 130. For instance, between 50-75% of the injected carbon dioxide may return with the production fluid 130. However, the returned carbon dioxide may be separated from the production fluid 130 and reinjected in some aspects of system 100. The remaining 25-50% of the injected carbon dioxide may remain in at least one of the subterranean zones 135, 140, and/or 145.

In some aspects of system 100, all or most of the injection fluid 125 may remain trapped in one or more of the subterranean zones 135, 140, and/or 145 (or other geologic formation). For example, in some aspects, the injection fluid 125 may be carbon dioxide, which is sequestered in a subterranean zone 135, 140, and/or 145 so as to remove greenhouse gasses from the atmosphere. In some aspects, providing carbon dioxide into the illustrated zones 135, 140, and/or 145 may include processes for: removing carbon from the atmosphere, either directly via industrial processes or indirectly via photosynthesis followed by other industrial processes, and depositing it in a geologic formation; capturing carbon dioxide from an industrial process (e.g., such as flue gases from power stations) that may otherwise be emitted to the atmosphere and injecting the captured carbon dioxide into the one or more subterranean zones 135, 140, and/or 145; and natural biogeochemical cycling of carbon between the atmosphere and the one or more subterranean zones 135, 140, and/or 145.

Although described as a "system," system 100 may also be a sub-system of a larger system for producing and/or supplying low life cycle hydrocarbons that further includes, for example, transportation sub-systems (e.g., pipelines, land-based transportation, water-based transportation, air-based transportation, and other techniques), refining and/or processing sub-systems (e.g., to refine a raw hydrocarbon, such as production fluid 130, into a transportation fuel), dispensing sub-systems (e.g., transportation fuel dispensing stations for commercial and private consumers), and other sub-systems.

In some embodiments of the system 100, using carbon dioxide (or other greenhouse gas, for example) as the injection fluid 125 may reduce a carbon dioxide emission intensity of the production fluid 130 or other transportation fuel derived (e.g., refined) from the production fluid 130. For example, by using carbon dioxide as the injection fluid 125, a life cycle analysis of carbon content of a transportation fuel derived from the production fluid 130 may be reduced due to, for instance, including a lifecycle accounting credit for the net removal of the injected carbon dioxide from the atmosphere. In some instances, inclusion of such an accounting credit may enable the transportation fuel derived from the production fluid 130 to be classified as a low-carbon fuel. In particular, a hydrocarbon fuel produced from the production fluid 130 and having a lifecycle carbon dioxide emissions accounting credit reflecting injection of atmospheric carbon dioxide within the injection fluid 125 may define a new hydrocarbon fuel pathway and/or be assigned a lifecycle CI value lower than that other hydrocarbon fuels and/or lower than the value required under certain regulatory frameworks. In the case that the lifecycle CI value for such a fuel pathway is lower than the regulatory value required, supply of hydrocarbon fuels so produced may enable generation of tradable emissions credits, which can be used for the fuel supplier's own compliance purposes or traded to other regulated parties.

In some cases, obtaining a credit for a transportation fuel requires a nexus between the raw hydrocarbons used to produce the transportation fuel and the transportation fuel itself. For instance, referring to FIG. 1, for example, any transportation fuel(s) refined from the production fluid 130 may only qualify as low-carbon fuel(s) if the injection fluid 125 was provided to the wellbore or system of wellbores from which the production fluid 130 is produced, as opposed to independent wellbores owned and/or operating by the same entity.

Thus, a transportation fuel provider that provides a low-carbon fuel according to the above-description of FIG. 1. The transportation fuel provider may include, for example, any entity which owns title to a fuel when it is produced from, or enters into, a particular legal jurisdiction (e.g., a country, region, state, municipality, economic union, other otherwise). The transportation fuel provider that provides a low-carbon fuel may thus be able to access markets designated for low CI hydrocarbon products (e.g., fuels) and/or generate tradable emissions credits, thus becoming a carbon "creditor" in a regulatory scheme that includes one or more standards or thresholds for a maximum or average CI for a transportation fuel.

In conventional systems for producing and/or supplying a transportation fuel, a transportation fuel may be assigned a CI based on a standard value. The standard value may be determined according to, for example, a location of a production site for raw hydrocarbons that are refined into the transportation fuel (e.g., Texas, Canada, Saudi Arabia, etc.); a particular geologic formation from which such raw hydrocarbons are produced (e.g., shale, sandstone, etc.); and/or a delivery path between the production site and final deliver (e.g., pipeline, ground transportation, ocean transportation etc.).

Figure 2A:
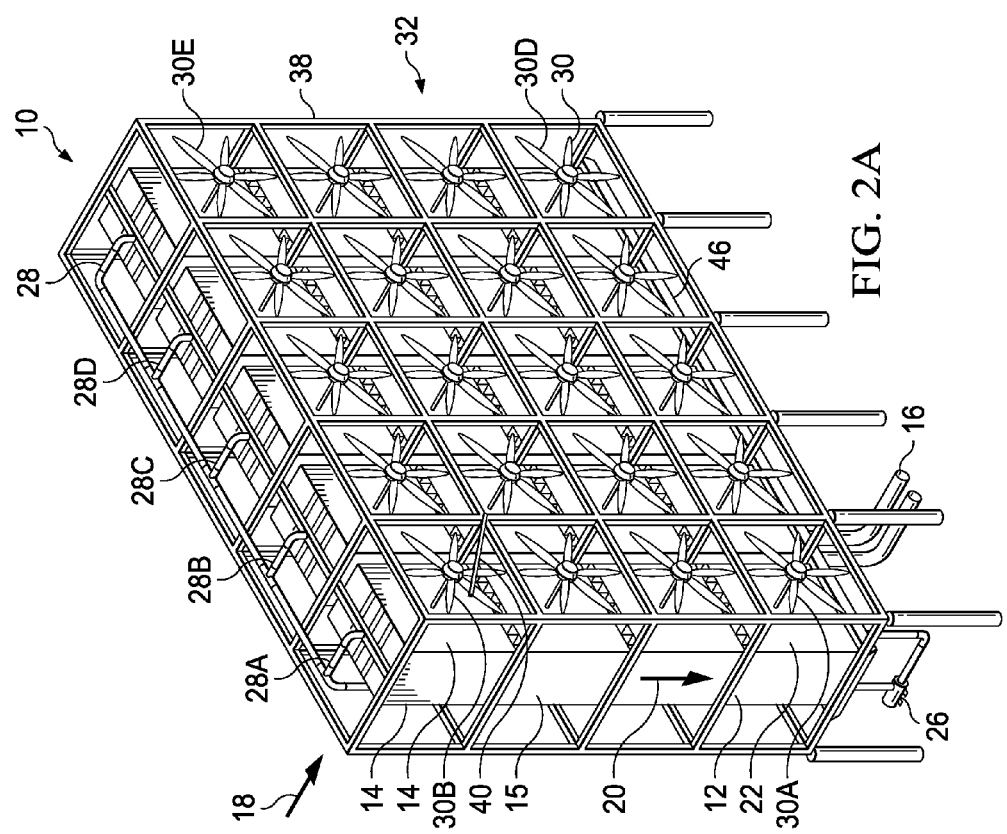
FIGS. 2A-2C illustrate an example embodiment of a system for capturing atmospheric carbon dioxide for use in a system for producing and/or supplying a low-carbon hydrocarbon fuel according to the present disclosure.
Figure 2B:
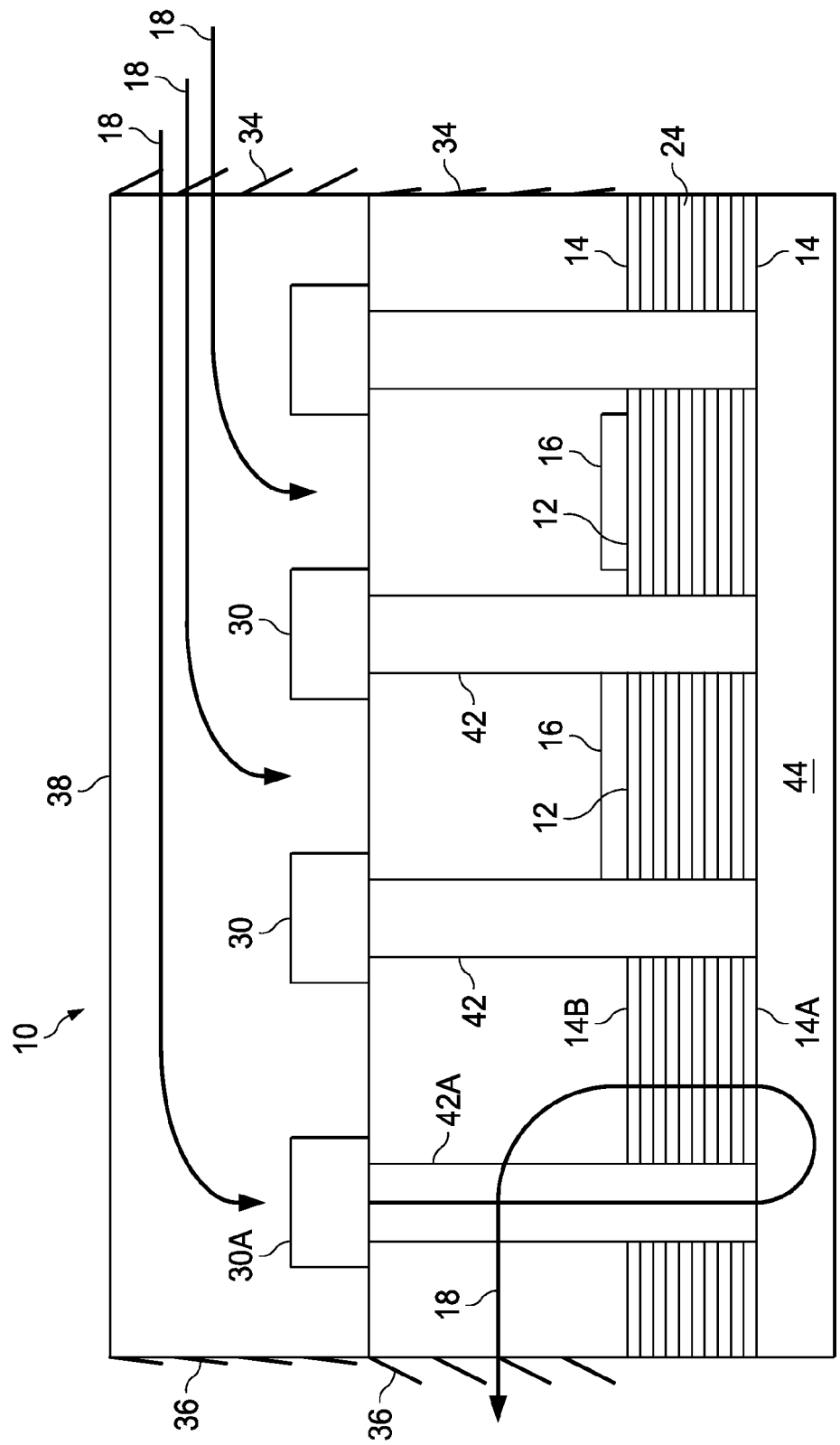
Figure 2C:
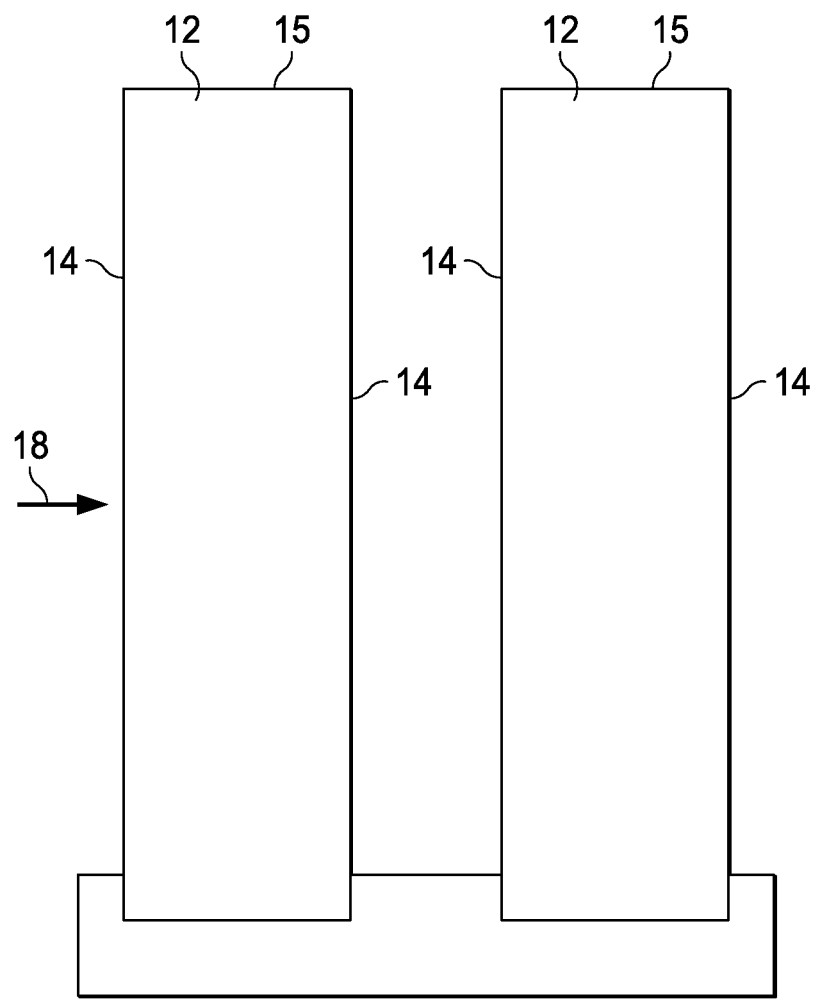

FIGS. 2A-2C illustrate an example embodiment of a system for capturing atmospheric carbon dioxide for use in a system for producing and/or supplying a low-carbon transportation fuel. For example, in some embodiments, the system(s) described with reference to FIGS. 2A-2C may capture carbon dioxide, which is used as the injection fluid 125 in system 100. For example, with reference to FIG. 2A in particular, a carbon dioxide capture facility 10 is illustrated including packing 12 formed as a slab 15, the slab 15 having opposed dominant faces 14, the opposed dominant faces 14 being at least partially wind penetrable to allow wind to flow through the packing 12. At least one liquid source 16 is oriented to direct carbon dioxide absorbent liquid into the packing 12 to flow through the slab 15. The slab 15 is disposed in a wind flow 18 that has a non-zero incident angle with one of the opposed dominant faces 14. The packing 12 may be oriented to direct the flow of carbon dioxide absorbent liquid through the slab 15 in a mean flow direction 20 that is parallel to a plane 22 defined by the opposed dominant faces 14. It should be understood that opposed dominant faces 14 don't have to be exactly parallel. In one embodiment, the faces 14 may be converging, diverging, or curved for example. Packing 12 may be oriented to allow the carbon dioxide liquid absorbent to flow through the packing 12 by gravity, as illustrated. In some embodiments, packing dimensions can be about 200 m by about 20 m by about 3 m contained in a structure measuring about 200 m by 25 m by 7 m. In some embodiments, dimensions can range from about 10 m by about 7 m by about 2 m to about 1000 m by about 50 m about 15 m.

The non-zero incident angle refers to the fact that wind flow 18 strikes the face 14 at an angle greater than zero. This may be contrasted with traditional packing arrangements, where gas is flowed through a tower of packing starting from the very bottom. In some embodiments, the non-zero incident angle is orthogonal with the one of the opposed dominant faces. It should be understood that the non-zero incident angle may be within 10% of exactly orthogonal. The non-zero incident angle may also refer to the mean angle of flow of the wind. The mean angle of flow of the wind may be averaged over a period of time.

In some embodiments, the packing 12 further includes structured packing. The packing 12 may be, for example, 1-2 meters thick between the opposed dominant faces 14. In other embodiments, the packing 12 may be thicker or thinner. The term structured packing may refer to a range of specially designed materials for use in absorption and distillation columns and chemical reactors. Structured packings typically consist of thin corrugated material 24, such as metal plates or gauzes arranged in a way that they force fluids to take complicated paths through the column, thereby creating a large face area for contact between different phases. Structured packings may be made out of corrugated sheets arranged in a crisscrossing relationship to create flow channels for the vapor phase. The intersections of the corrugated sheets create mixing points for the liquid and vapor phases. Wall wipers are utilized to prevent liquid and/or vapor bypassing along the column wall. Rotating each structured packing layer about the column axis provides cross mixing and spreading of the vapor and liquid streams in all directions.

The opposed dominant faces 14 may be oriented vertical. The orientation of faces 14 may be determined relative to, for example, the ground. In other embodiments, faces 14 may be oriented at an angle to the ground, e.g., slanted. The opposed dominant faces 14 may be oriented horizontal in some embodiments. These embodiment tends to have a larger footprint than the vertical slab embodiment. The packing 12 may be formed as plural slabs 15. Plural slabs may also be, for example, by plural slabs arranged end-to-end, as opposed to the stacked orientation illustrated in FIG. 2C. In some embodiments, the slab might be vertically sectionalized, effectively providing plural slabs end to end on top of one another. This may be required in order to get sufficiently good distribution of liquid in such a narrow aspect ratio (e.g., 20 m high by 1.5 m wide). Between the vertical sections there may be a collector/distributor system that collects fluid flowing from above and redistributes it evenly to the packing slab below. In some embodiments, such a collector/distributor system may be present in any slab as disclosed herein.

The at least one liquid source 16 may further include at least one pump 26. Pump 26 may have several distribution pipes 28, controlled by a valve (not shown), in order to selectively apply liquid into various sections of packing 12. The at least one pump 26 may be configured to supply the carbon dioxide absorbent liquid in a series of pulses.

At least one fan 30 may be oriented to influence wind flow through at least a section of one of the opposed dominant faces 14 of the packing 12. Fan 30 may be reversible. In some embodiments, fan 30 may prevent the wind flow that has already flowed through the packing 12 from circulating back into the packing 12. In some embodiments, at least one fan 30 may drive the wind flow into packing 12. Referring to FIG. 2A, the fan 30 may further include plural fans, each of the fans being oriented to influence wind flow through at least a respective portion of the packing 12. In some embodiments, the respective portion is understood as being the portion of the packing 12 that air flow through fan 30 would have the greatest influence over, for example the packing 12 most adjacent or closest to fan 30. The at least one fan 30 may be provided as part of a fan wall 32 adjacent at least one of the opposed dominant faces 14. It should be understood that fan walls (not shown) may be located adjacent each of faces 14. Adjacent, in this document, is understood to mean next to, and can include embodiments (such as the one illustrated in the figures) where the fan wall 32 is spaced from, but adjacent to, face 14.

The fan wall 32 may be adjacent the one of the opposed dominant faces 14 through which the wind flow 18 is exiting the packing 12. In fan wall 32, the individual fans may be separated by impermeable material. The fans 30 create a pressure drop across the wall 32, which drives flow through the packing 12. In some embodiments, fan wall 32 is designed such that, in the event that a fan fails, and ultimately blocks of its respective flow, flow through the packing 12 would be almost, if not completely, unaffected. This may be accomplished by closely spacing adjacent fans, and by spacing the fan wall 32 from the packing 12, for example.

Facility 10 may further include wind guides 34 oriented to direct the flow of wind 18 into the packing 12. Facility 10 may further include wind guides 36 oriented to direct the flow of wind 18 out of the packing 12. Wind guides 34 and 36 may be, for example, louvers. The wind guides 34 and 36 may be independently controllable. In this embodiment, wind flow 18 is directed from the right to the left. Thus, the upper wind guides 34 are open, with the lower wind guides 34 closed. Similarly, upper wind guides 36 are closed, while lower wind guides 36 are open. Thus, wind flow 18 has a net flow from upper wind guides 24 to lower wind guides 36, passing through packing 12 in the process.

The facility 10 may be part of an at least partially enclosed structure 38. Because of the nature of the embodiments disclosed herein, that being that they may involve the processing of great deals of wind, it may be important to shield facility 10 from the elements, including animals and insects. Wind guides 36 and 34 may aid in this, along with a surrounding structure adapted to selectively let in and process wind flow. In some embodiments, a protective covering (not shown) may be provided over packing 12 to prevent animal intrusion but allow wind flow to pass through. A cleaning device 40 for cleaning the walls of the at least partially enclosed structure 38 may be provided. Cleaning device 40 may be, as illustrated for example, a wiper that rotates about an axis to clean the exterior of fan wall 32, for example. Wind guides 34 and 36 may be horizontally oriented, for example.

The facility 10 may further include at least one wind passage 42 extended through the opposed dominant faces 14 to deliver wind flow selectively to one of the opposed dominant faces 14. Wind passage 42 may have fan 30 attached to influence air flow through wind passage 42. Wind passage 42 allows wind to travel through faces 14, where it is released into basin 44, where the wind is free to pass into packing 12 through face 14A, exiting the packing 12 through face 14B. This way, wind flow may be induced to flow through the horizontal faces 14 of a horizontal slab of packing 12. Wind passages 42 may be, for example, air ducts that are 10 m in height. In the embodiment illustrated, wind passages 42 are vertical ducts in which carbon dioxide rich inlet air is moving down. These ducts may cover .about.⅕ of the surface area (e.g., about 1.2 m diameter tube arranged in a grid with 5 meter spacings).

A sink 46 may be provided for collecting carbon dioxide absorbent liquid that has flowed through the packing 12. The sink is illustrated as basin 44. Basin 44 may be, for example a concrete-lined basin that catches the hydroxide and contains supports to hold the packing. In some aspects, there may be a gap as illustrated between the packing 12 and the base 44 that can be about 1 to 1.5 m for example. In some embodiments (not shown), sink 46 may be a pipe or a series of conduits for example, that transport the liquid directly from packing 12. This type of system may involve a funneling or drainage apparatus designed to focus the drainage of the liquid into a single, or a network of pipes. The contacted liquid may then be recirculated through the packing, or it may be recycled and then recirculated.

In some embodiments, facility 10 further includes a recycling system 48 for regenerating spent carbon dioxide absorbent liquid. The recycling system may be, for example, any system for recycling spent carbon dioxide liquid absorbent. For example, the carbon dioxide absorbent liquid may include a hydroxide solution, for example a sodium hydroxide solution. The source of liquid 16 preferably supplies recycled carbon dioxide absorbent liquid.

Referring to FIGS. 2A-2B, a method of carbon dioxide capture is illustrated. Carbon dioxide absorbing liquid is applied into packing 12 in a series of pulses. Referring to FIG. 2C, each pulse 50 may involve, for example, a short period during which the liquid is supplied into packing 12 by source of liquid 16. Each pulse doesn't have to be a sharp transient application, but can be a period of time during which liquid is being supplied. A gas containing carbon dioxide, for example air illustrated by flow of wind 18, is flowed through the packing 12 to at least partially absorb the carbon dioxide from the gas into the carbon dioxide absorbing liquid. Applying may further include pumping. Flowing may further include flowing the gas containing carbon dioxide through the packing at least when the carbon dioxide absorbing liquid is not being applied. The flow of gas may be controlled using fans 30, for example. The flow of gas may be controlled using fans 30 and wind guides 34 and 36. The flowing of the gas may be at least restricted when the carbon dioxide absorbing liquid is being applied. This may be envisioned by the fans 30 of fan wall 32 ceasing to spin and draw the flow of wind through packing 12 when the pulse of liquid is being supplied to packing 12.

In some embodiments, the series of pulses has a duty cycle of 1-50%. In other embodiments, the duty cycle may be 5% for example. The duty cycle refers to the ratio of the time duration of a pulse of applied liquid to the overall time duration of a cycle. For example, a 50% duty cycle implies the fluid is only flowing half the time the facility is operational. This means the pulse runs from 1 to 50% of the time the system is operational, and therefore a 1% duty cycle means that for every second that fluid is flowing is off for 100 seconds. In more realistic values, it is on for 30 seconds and off for 3000 seconds and a 50% duty cycle means the pump would run for 30 seconds and be off for the next 30 seconds. In some embodiments, the series of pulses has an off-time of 10-1000 seconds. In other embodiments, the series of pulses has an off-time of 100-10000 seconds.

The step of applying may further include applying the carbon dioxide absorbing liquid into a first portion of the packing 12 in a first series of pulses, and applying the carbon dioxide absorbing liquid into a second portion of the packing 12 in a second series of pulses. This may be envisioned by selectively applying liquid via distribution tubes 28A and 28B to packing 12. Because tubes 28A and 28B only feed a portion (e.g., the left-most portion) of packing 12, only that portion will have liquid applied to it. Liquid may then be selectively applied to the right hand portion of packing 12 by applying liquid via tubes 28C and 28D. The first and second series of pulses may be synchronized, asynchronized, completely different, or synchronized out of phase with one another, for example, allowing fluids to be supplied intermittently from a continuously operating pump. In these embodiments, flowing the gas may further include at least restricting the flow of the gas containing carbon dioxide through the first portion of the packing when the carbon dioxide absorbing liquid is not being applied, and at least restricting the flow of the gas containing carbon dioxide through the second portion of the packing when the carbon dioxide absorbing liquid is not being applied. Thus, while the first portion has liquid being applied to it, for example the left hand portion of face 14 when liquid is being applied via tubes 28A and 28B, the flow of gas may be restricted or stopped altogether through the left hand portion of face 14. This may be accomplished by reducing, stopping, or even reversing fans 30A and 30B, for example. Similarly, while the second portion has liquid being applied to it, for example the right hand portion of face 14 when liquid is being applied via tubes 28C and 28D, the flow of gas may be restricted or stopped altogether through the right hand portion of face 14. This may be accomplished by reducing, stopping, or even reversing fans 30D and 30E, for example.

In some embodiments, the first series of pulses and the second series of pulses are staggered. This may be advantageous, as when the left portion of face 14 has liquid being applied to it as described above, the right hand portion and center portions do not. Similarly, when the supply of liquid to the left hand portion is ceased, the source of liquid 16 may then apply liquid to the center or right hand portion, for example. This way, source of liquid 16 may cyclically feed liquid to the entire volume of packing 12 in a more efficient manner, instead of continuously feeding liquid to the entire volume of packing 12. In some aspects, an example of this may be further envisioned, with a horizontal slab of packing 12. In such aspects, the flow of wind through any of the various wind tubes 42 may be controlled, in order to achieve the same effect as that achieved above with the vertical slab embodiment. Referring to FIG. 2B, an embodiment is illustrated where only one wind tube 42A has wind being driven down it. This may be achieved by the selective actuation of fan 30A, for example. Thus, the packing 12 that is nearest the outlet of wind tube 42A may have a flow of gas fed to it.

In some embodiments, the off-cycle of the series of pulses may be less than or equal to the time it takes for carbon dioxide absorbing liquid to stop draining from the packing after a pulse. It should be understood that this is not the time required for the entire pulse to be removed from the packing 12, since some liquid will always be left over as residue inside the packing 12. In other embodiments, the off-cycle of the series of pulses may be less than or equal to the time it takes for a pulse of carbon dioxide absorbing liquid to lose 70-80% of the pulses carbon dioxide absorption capacity.

The packing may be oriented to flow the carbon dioxide absorbing liquid through the packing 12 in a mean liquid flow direction 20. Flowing may further include flowing the gas through the packing 12 obliquely or perpendicularly to the mean liquid flow direction 20. As disclosed above, this is advantageous as the flow of gas may have a different flow direction than, and one that is not counter current to, the mean liquid flow direction 20 of the liquid. Thus, a larger surface area of the packing may be used to full advantage, greatly increasing the quantity of wind or gas that may contact liquid in packing 12 over a course of time while still allowing the liquid to pass through and drain from packing 12. In these embodiments, a slab is not entirely necessary, in fact other shapes of packing 12 are envisioned, including but not limited to a cube, a cylindrical, and other various shapes. Referring to FIG. 2A, in some embodiments flowing the gas further includes flowing the gas through the packing 12 perpendicularly to the mean liquid flow direction 20. It should be understood that exact perpendicularity is not a requirement. Flowing may further include flowing the gas through at least one of the opposed dominant faces 14, for example through both of faces 14 as indicated.

These methods may involve recycling the carbon dioxide absorbing liquid. Also, the methods may involve influencing the flowing of the gas through the packing. Influencing may include, for example, preventing the gas that has already flowed through the packing 12 from circulating back into the packing 12. Influencing may further include driving the flowing of the gas in a drive direction that is at least partially oriented with an ambient wind flow direction. This may be carried out using fans 30, which may be reversible in order to carry out this function. Further, these methods may involve directing the flow of gas at least one of into and out of the packing, using, for example louvers as already disclosed.

In some embodiments, fans 30 may be reversible in order to enable the flow to be driven in the direction of the ambient wind field, which is more efficient than inducing a flow that is counter to the prevailing wind direction. In some aspects, the orientation of slabs 15 may be such that prevailing wind 18 is perpendicular to the slab 15, and is in the direction at which the fan wall (not shown) works most efficiently. The packing design may use vertically oriented plates. This would be a modification of conventional structured packing designed to enable, for example, orthogonal liquid and gas flow directions. Packing may be for intermittent fluid flow so as to maximize the hold up of liquid absorbent inside the packing material. Referring to FIG. 2A, as disclosed above, the fan wall 32 may be sectionalized, so that flow speed can be reduced or stopped when fluid is flowing to minimize fluid loss. The sections may be operated asynchronously so that only one section at a time is receiving the fluid flow enabling fluid pumps to operate continuously. For example, if fluid flow was needed for 100 seconds out of 1000 one may have 11 sections and would direct the fluid into one of them at a time.

Compared to the horizontal slab geometry, the vertical slab may: minimize the footprint and the total structure size per unit of capacity to reduce the capital cost, reduce peak velocity, improve efficiency, and enables the packing to be operated at higher peak velocities further reducing capital costs.

Some embodiments may invoke the use of louvers to enable the flow to be driven in the direction of the ambient wind without altering the operation of the fans. For instance, the packing design may using coaxial flow or counter current flow, while still benefiting from the larger surface area of the slab to increase the amount of wind flow through the slab. The flow geometry allows one to get even flow though a large horizontal slab mounted just above a fluid reservoir while maintaining air speeds below about 5 msec. The air speed constraint determines the ratio of the structures height to its width. Specifically, height/width is approximately equal to airspeed-at-packing/air-speed-at-exit. Compared to the vertical slab geometry, the horizontal slab has a larger footprint, and may have higher costs, but it has the advantage that it may use more conventional packing and fluid distribution.

Referring to FIG. 2, another method of carbon dioxide capture is illustrated. Carbon dioxide absorbing liquid is flowed through packing 12 in a mean liquid flow direction 20, a gas containing carbon dioxide is flowed through the packing 12 obliquely or perpendicularly to the mean liquid flow direction 20 to at least partially absorb the carbon dioxide from the gas into the carbon dioxide absorbing liquid. Flowing carbon dioxide absorbing liquid through packing 12 may further include applying the carbon dioxide absorbing liquid into the packing 12 in a series of pulses. The series of pulses has been disclosed in detail throughout this document, and need not be built upon here. As disclosed above, flowing the gas further may include flowing the gas through the packing 12 perpendicularly to the mean liquid flow direction 20.

A method of contacting a liquid with a gas is also disclosed including applying the liquid into packing 12 in a series of pulses and flowing the gas through the packing 12. While this method is also envisioned for some of the embodiments herein, it may not be as efficient as the pulsed method, as it requires far greater pumping action. Thus, the pulsed method may be applied to any gas-liquid contactor, because it has been proven herein to afford sufficient gas-liquid contact despite a lack of continuous pumping. An exemplary application of this may be provided as a scrubbing unit at a refinery, for example. It should be understood that the gas-liquid contactor may have all of the same characteristics as the carbon dioxide capture facility as disclosed herein.

Further disclosed is a method of contacting a liquid with a gas including flowing the liquid through packing in a mean liquid flow direction, and flowing the gas through the packing obliquely or perpendicularly to the mean liquid flow direction. Similar to the gas-liquid contactor, this method may be applied to any gas-liquid contact system. By having the gas flowed through the packing at an angle, the structure of such a contactor employing this method would be greatly simplified, since the gas inlet and outlet will be at different locations in the packing then the liquid source and sink. This method may have most or all of the same characteristics as the carbon dioxide capture methods disclosed herein. For example, flowing the liquid through the packing may further include applying the liquid into the packing in a series of pulses. Furthermore, flowing the gas may further include flowing the gas through the packing perpendicularly to the mean liquid flow direction.

Referring to FIG. 2A, a gas-liquid contactor (illustrated by facility 10) is also disclosed. The contactor (illustrated as facility 10) includes packing 12 formed as a slab 15, the slab 15 having opposed dominant faces 14, the opposed dominant faces 14 being at least partially wind penetrable to allow wind to flow through the packing 12. At least one liquid source 16 is oriented to direct the liquid into the packing 12 to flow through the slab 15. The slab is disposed in a wind flow 18 that has a non-zero incident angle with one of the opposed dominant faces 14. It should be understood that this gas-liquid contactor may have all of the same characteristics as the carbon dioxide capture facility and contactor disclosed herein.

Referring to FIG. 2A, a gas-liquid contactor (illustrated by facility 10) is also disclosed, including a slab 15 structure including packing 12 and a liquid source 16 oriented to direct the liquid into the packing 12 to flow in a mean liquid flow direction 20. The slab structure is disposed in a wind flow 18 that flows obliquely or perpendicularly to the mean liquid flow direction 20. It should be understood that this gas-liquid contactor may have all of the same characteristics as the carbon dioxide capture facility and contactor disclosed herein.

A method of contacting a liquid with a moving gas (illustrated as wind flow 18) is also disclosed. The method includes flowing the liquid through packing 12, and driving the moving gas through the packing 12 in a drive direction (illustrated as 18B, which is the same as wind direction 18 in this embodiment) that is at least partially oriented with an ambient flow direction 18 of the moving gas. In the embodiment shown, the flowing gas is wind, and the ambient flow direction is the ambient wind direction 18. This method may further include reversing the drive direction 18B when the ambient flow direction 18 reverses. Reversing the fan direction (or more generally, reversing the forced flow of air through the packing) in such a way as to drive the air with a vector direction that is at least partially oriented with the ambient wind 18 reduces the required fan power. Further, this reduces the amount of low-carbon dioxide air that is recycled back into the inlet of the system, thus improving its efficiency. It is thus advantageous to align the packing such that one of opposed dominant face 14 is roughly perpendicular to the prevailing wind, in order to maximize the efficiency of the fans.

Under some regulatory systems generically referred to as "cap-and-trade," tradable emission rights are created, and it may be possible for parties to create additional rights from "offsets" derived from reductions in emissions that occur outside the set of emitters that are directly regulated under the cap-and-trade system. The system disclosed here may be used to generate tradable emissions rights or reduce the number of tradable emissions rights that a regulated entity must acquire to achieve compliance under cap-and-trade regulatory systems.

The production of low CI hydrocarbon products is distinct from the types of offsets often used within cap-and-trade regulatory systems, as the use of the methods described herein allows the production of hydrocarbon products (e.g., transportation fuels and other products) having reduced CI values without the use of offsets from outside the production process. This may be an advantage in regulatory systems that limit or exclude the use of economic offsets or that otherwise restrict emissions accounting to the production processes and supply chains used to provide particular products or fuels.

Other systems for atmospheric carbon dioxide capture may also be used in the disclosed system. These include, but are not limited to: direct capture of atmospheric carbon dioxide using solid sorbents that are regenerated using changes in temperature, moisture, and/or pressure to produce a concentrated carbon dioxide gas. These systems may use, for example, solid amines as or ion-exchange media as a solid sorbent media for carbon dioxide.

Figure 5A:
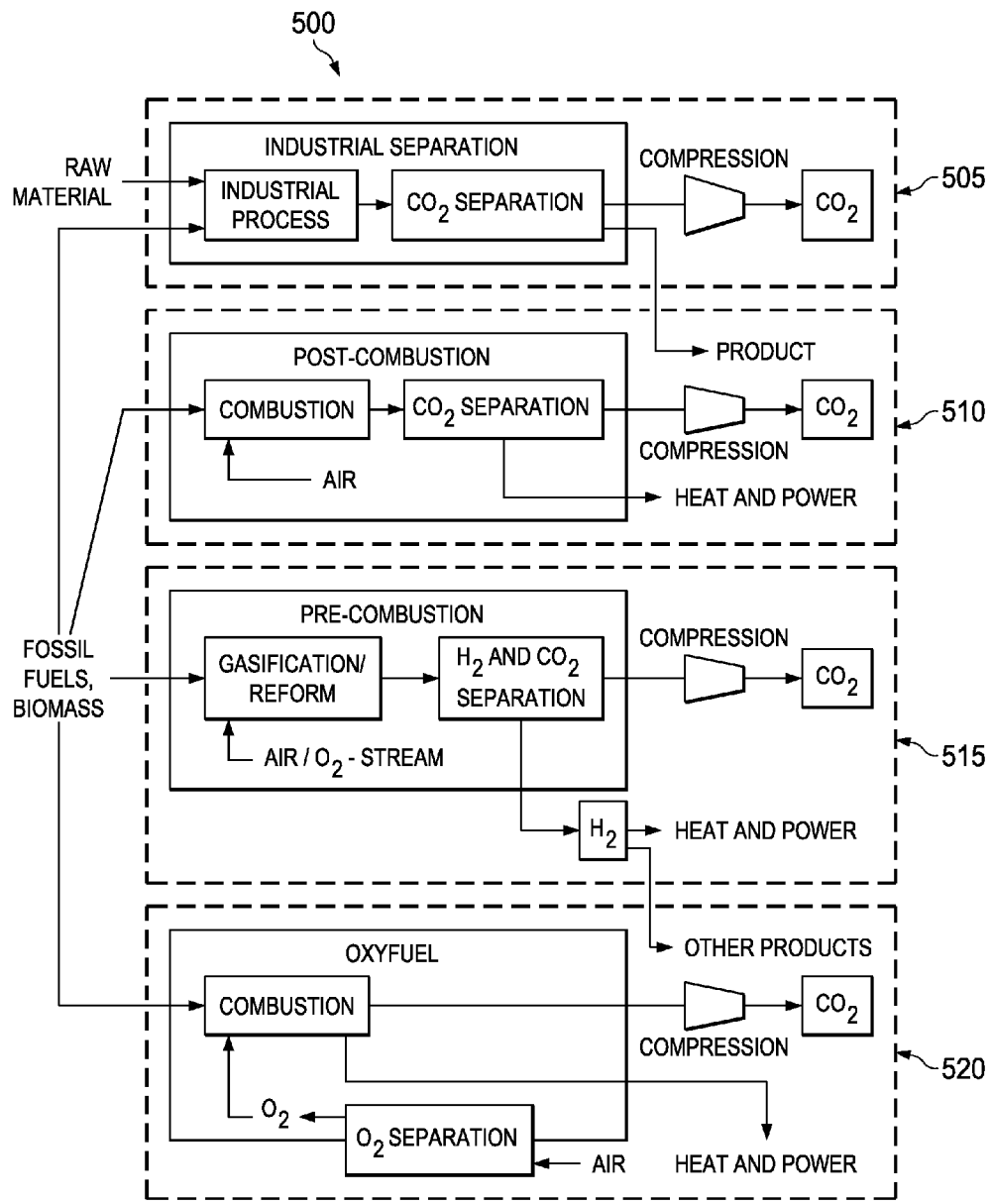
FIGS. 5A-5B illustrate schematic representations of example routes to carbon dioxide capture systems.
Figure 5B:
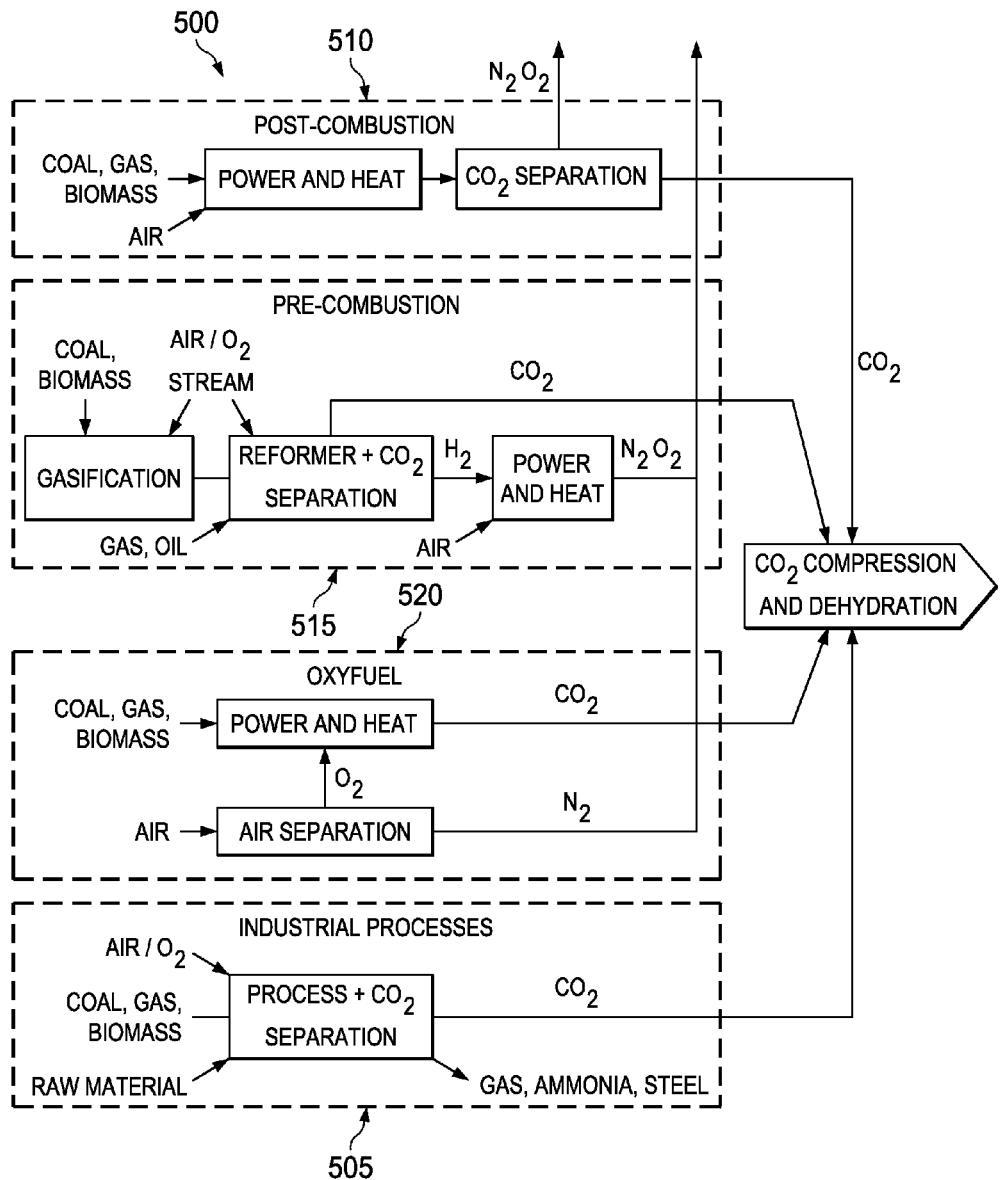

For example, capture of carbon dioxide can be applied to large point sources, such as fossil fuel or biomass energy facilities, major carbon dioxide-emitting industrial plants, natural gas production, petroleum production or refining facilities, synthetic fuel plants and fossil fuel-based hydrogen production plants. Turning in particular in FIGS. 5A-5B, these figures illustrate schematic representations 500 and 550, respectively, of example routes to capture systems, including industrial sources of carbon dioxide (such as natural gas processing facilities and steel and cement producers), oxyfuel combustion, pre-combustion (such as hydrogen and fertilizer production, and power plants using gaseous fuels and/or solid fuels that are gasified prior to combustion), and post-combustion facilities (such as heat and power plants). For instance, the schematic representation 500 shown in FIG. 5A illustrates four different example routes to carbon dioxide capture systems.

The first example route 505 is an industrial separation route in which a raw material and a fuel (e.g., a fossil fuel or biomass) is provided to an industrial process, which outputs a product containing carbon dioxide. The carbon dioxide is separated from the product output and then compressed through a compression process. Several industrial applications involve process streams from which carbon dioxide can be separated and captured. The industrial applications include for example iron, steel, cement and chemical manufacturers including ammonia, alcohol, synthetic liquid fuels and fermentation processes for food and drink.

The second example route 510 is a post-combustion separation route in which the fuel and air is provided to a combustion process, which outputs heat, power, and a product containing carbon dioxide. The carbon dioxide is separated from the product output and then compressed through a compression process. Capture of carbon dioxide from flue gases produced by combustion of fossil fuels (e.g., coal, natural gas, and/or petroleum fuels) and biomass in air is referred to as post-combustion capture. Instead of being discharged directly to the atmosphere, flue gas is passed through equipment which separates most of the carbon dioxide from the balance of flue gases. The carbon dioxide may be compressed for transport and fed to a storage reservoir and the remaining flue gas is discharged to the atmosphere. A chemical sorbent process, including amine based sorbents, for example, is typically used for carbon dioxide separation in post combustion carbon dioxide capture (PCC).

The third example route 515 is a pre-combustion separation route in which the fuel and, for instance, air or oxygen and steam, is provided to a gasification process, which outputs hydrogen and carbon dioxide. The output is separated so that the carbon dioxide is then compressed through a compression process, and heat, power, and other products are extracted from the hydrogen. Pre-combustion capture may involve reacting a fuel with oxygen or air and/or steam to give mainly a "synthesis gas (syngas)" or "fuel gas" composed of carbon monoxide and hydrogen among other compounds. The carbon monoxide may be reacted with steam in a catalytic reactor, called a shift reactor, to give a syngas rich in carbon dioxide and hydrogen. Carbon dioxide may be separated, usually by a physical or chemical absorption process, including glycol based solvents, for example, resulting in a hydrogen-rich fuel gas which can be used in many applications, such as boilers, furnaces, gas turbines, engines, fuel cells, and chemical applications. Other common compounds in syngas include, for example, carbon dioxide, methane, and higher hydrocarbons, which may be "cracked," "reformed," or otherwise processed to yield a desirable syngas composition, including, for example high concentrations of hydrogen, carbon monoxide, and carbon dioxide.

The fourth example route 520 is an oxyfuel separation route in which the fuel and oxygen (e.g., separated from air) is provided to a combustion process, which outputs heat, power, and carbon dioxide that is then compressed through a compression process. In oxy-fuel combustion, nearly pure oxygen is used for combustion instead of air, resulting in a flue gas that is mainly carbon dioxide and water. If fuel is burnt in pure oxygen, the flame temperature may be excessively high, but carbon dioxide and/or water-rich flue gas can be recycled to the combustor to moderate the temperature. Oxygen is usually produced by low temperature (cryogenic) air separation or other techniques that supply oxygen to the fuel, such as membranes and chemical looping cycles. The combustion systems of reference for oxy-fuel combustion capture systems are the same as those noted above for post-combustion capture systems, including power generation and/or heat production for industrial processes.

Figure 6:
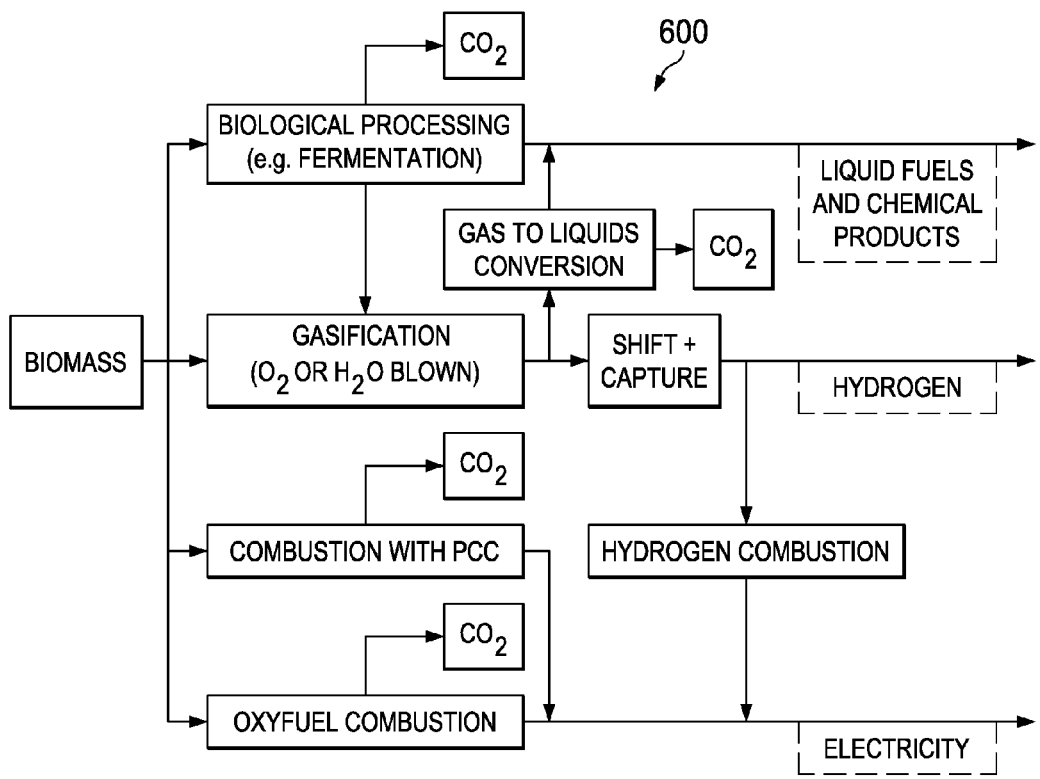
FIG. 6 illustrates a schematic representation of example routes to biomass with carbon dioxide capture systems.

As another example, with reference to FIG. 6, a schematic representation 600 is shown that illustrates routes to biomass with capture systems. For instance, schematic representation 600 illustrates a variety of processes (e.g., biological processing such as fermentation, gasification such as oxygen blown or water blown, combustion with PCC, or oxyfuel combustion) to which biomass is provided. The resultant output(s) of the example processes in representation 600, as shown, is carbon dioxide, liquid fuels and chemical products, hydrogen, and electricity. Other outputs may include heat that can be used for a variety of purposes (e.g., electrical generation, industrial processes, comfort cooling processes, and others).

Figure 7A:
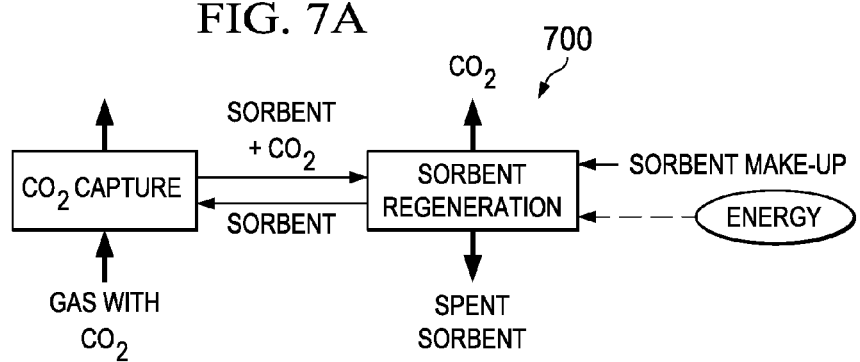
FIGS. 7A-7C illustrate example carbon dioxide separation systems.

Separation techniques include separation with sorbents or solvents, membrane separation, and separation by cryogenic distillation. Separation with sorbents/solvents may be achieved by passing the passing the carbon dioxide-containing gas in intimate contact with a liquid absorbent or solid sorbent that is capable of capturing the carbon dioxide. For example, FIG. 7A shows an example sorbent separation process 700 in which sorbent loaded with the captured carbon dioxide can be transported to a different vessel, where it releases the carbon dioxide (regeneration) after, for example, being heated, after a pressure decrease, or after any other change in the conditions around the sorbent. The sorbent resulting after the regeneration step can be sent back to capture more carbon dioxide in a cyclic process. The sorbent can be a solid and does not need to circulate between vessels because the sorption and regeneration are achieved by cyclic changes (in pressure or temperature) in the vessel where the sorbent is contained. A make-up flow of fresh sorbent can be introduced to compensate for the natural decay of activity and/or sorbent losses. The sorbent can be a solid oxide which reacts in a vessel with fossil fuel or biomass producing heat and mainly carbon dioxide. The spent sorbent can be circulated to a second vessel where it is re-oxidized in air for reuse with some loss and make up of fresh sorbent.

Figure 7B:
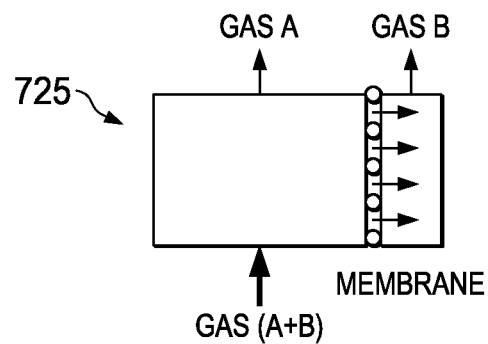

An example membrane separation process 725, as shown in FIG. 7B, may utilize membranes (e.g., of specially manufactured materials) that allow the selective permeation of a gas therethrough. The selectivity of the membrane to different gases is intimately related to the nature of the material, but the flow of gas through the membrane is usually driven by the pressure difference across the membrane. Therefore, high-pressure streams may be used for membrane separation. There are many different types of membrane materials (e.g., polymeric, metallic, ceramic) that may find application in carbon dioxide capture systems to preferentially separate hydrogen from a fuel gas stream, carbon dioxide from a range of process streams or oxygen from air with the separated oxygen subsequently aiding the production of a highly concentrated carbon dioxide stream.

Figure 7C:
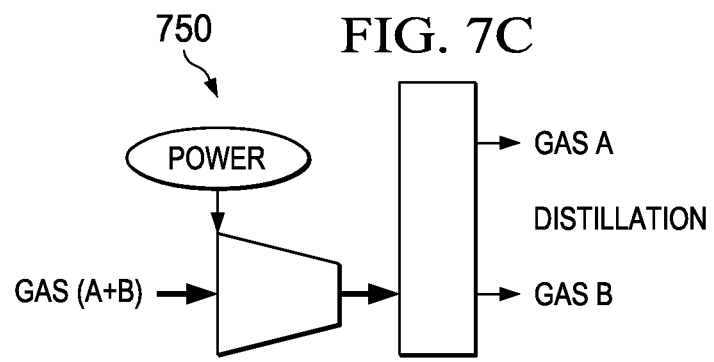

FIG. 7C illustrates an example separation process 750 by cryogenic distillation. A gas can be made liquid by a series of compression, cooling and expansion steps. Once in liquid form, the components of the gas can be separated in a distillation column. Oxygen can be separated from air following the scheme of FIG. 7C and be used in a range of carbon dioxide capture systems (oxy-fuel combustion and pre-combustion capture).

Figure 3A:
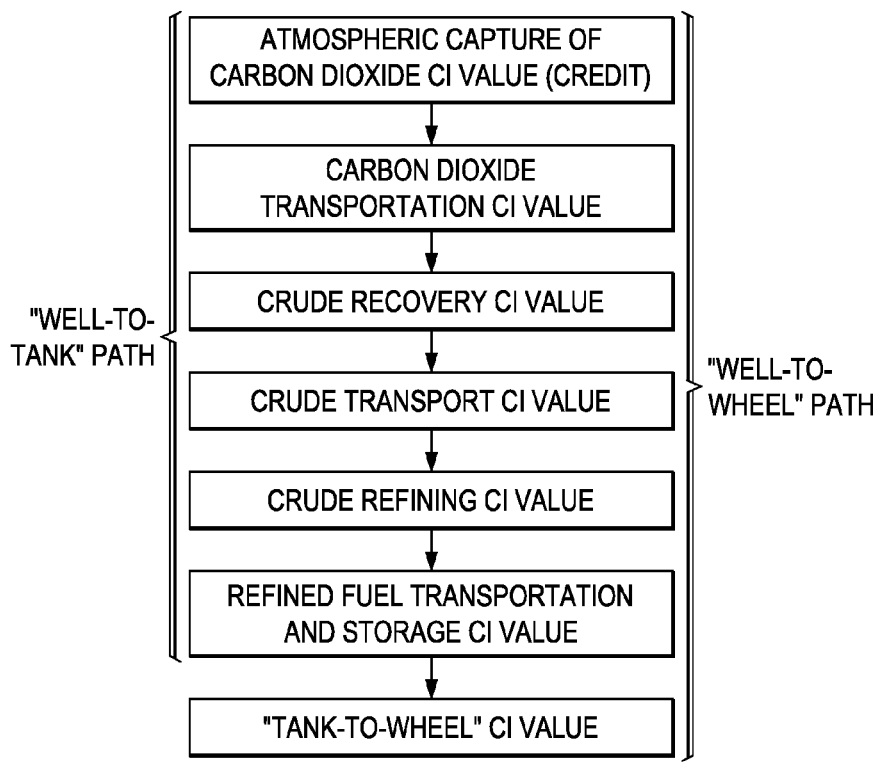
FIGS. 3A-3B illustrate example methods for accounting for carbon flows and determining a regulatory value of a low CI hydrocarbon fuel according to the present disclosure.
Figure 3B:
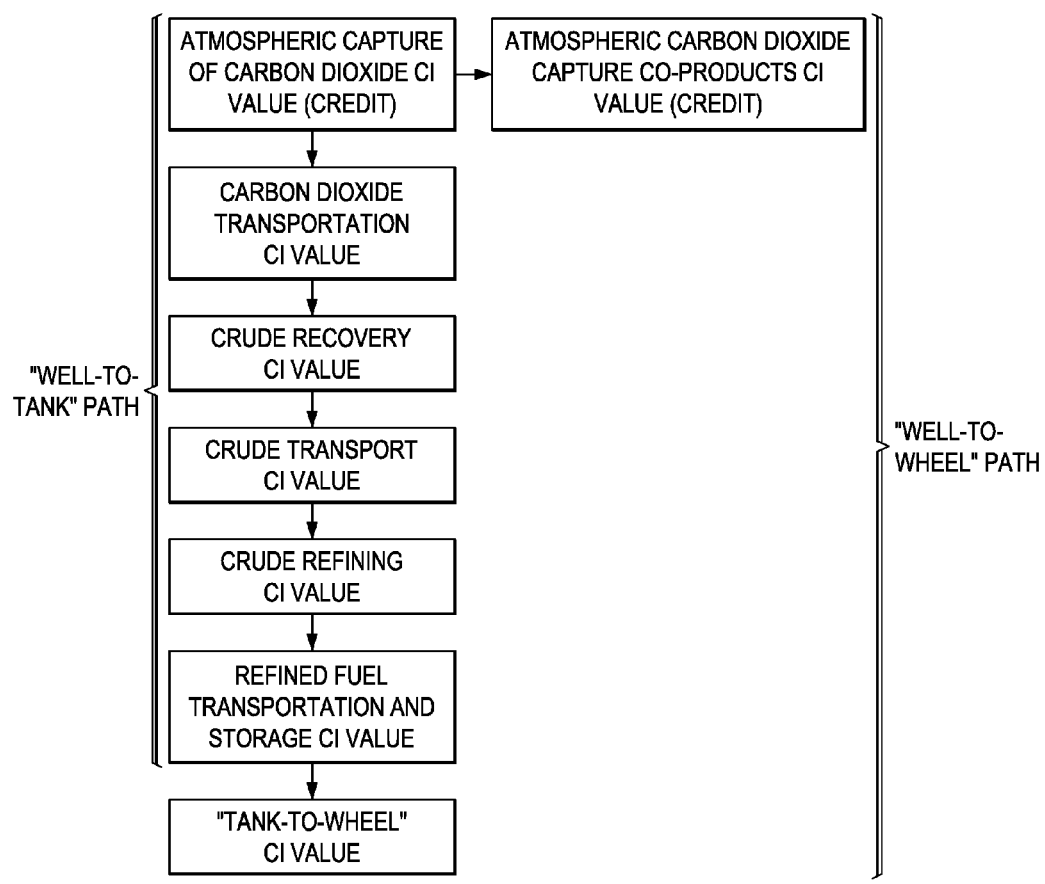

Turning now to FIGS. 3A-3B, these figures illustrate example methods for accounting for carbon flows and determining a regulatory value of a low CI hydrocarbon fuel. For example, some embodiments of producing and/or supplying a low CI fuel operate within the context of various regulatory systems, enabling the environmental benefits to be quantified and associated with a raw hydrocarbon, hydrocarbon fuel, or a tradable credit. Thus, these embodiments also can provide an economic incentive, which would not have existed prior to the implementation of such regulatory systems, for affecting environmental objectives.

In one aspect, systems disclosed here for producing and/or supplying a low CI product (e.g., fuel) provide a computerized method of using a data processor having a memory to account for carbon flows and determine a regulatory value for a hydrocarbon fuel. The method includes (i) storing, in memory, a set of one or more values characterizing carbon flows associated with the production and use of hydrocarbon fuel(s), wherein one or more of the values represent injection of a fluid containing atmospheric carbon dioxide—captured either directly via industrial processes or indirectly via photosynthesis and industrial processing of resultant biomass and/or carbon dioxide captured from industrial processes that may otherwise be emitted to the atmosphere—into the geologic formation(s) from which raw hydrocarbons are produced such that the injected atmospheric carbon dioxide is sequestered in the geologic formation(s) and mitigates anthropogenic GHG emission, including but not limited to other emissions resulting from production and use of the hydrocarbon fuel; and (ii) calculating, using the data processor, a regulatory value for the hydrocarbons from the stored carbon flow values.

In another aspect, systems disclosed here for producing and/or supplying a low CI fuel provide a method of engineering a carbon cycle for hydrocarbon production and use. The method includes: (i) arranging the production of hydrocarbon fuel(s), wherein a fluid containing atmospheric carbon dioxide—captured either directly via industrial processes or indirectly via photosynthesis and industrial processing of resultant biomass and/or carbon dioxide captured from industrial processes that may otherwise be emitted to the atmosphere—is injected into the geologic formation(s) from which raw hydrocarbons are produced such that the injected atmospheric carbon dioxide is sequestered in the geologic formation(s) and mitigates anthropogenic GHG emission, including but not limited to other emissions resulting from production and use of the hydrocarbon fuel; and (ii) assigning a regulatory value to the bio fuel from a set of one or more carbon intensity values characterizing the production and use of the hydrocarbon, including one or more values characterizing the sequestration of atmospheric carbon dioxide in the geologic formation from which raw hydrocarbons are produced.

In yet another aspect, systems disclosed here for producing and/or supplying a low CI fuel provide a method of manufacturing a hydrocarbon fuel. The method includes (i) injecting a fluid containing atmospheric carbon dioxide into hydrocarbon containing geologic formation(s) such that a portion of atmospheric carbon dioxide is sequestered in the geologic formation(s) and mitigates anthropogenic GHG emission, (ii) producing raw hydrocarbons from geologic formation(s) into which the atmospheric carbon dioxide containing fluid was injected and refining raw hydrocarbons into finished hydrocarbon product fuels, and (iii) assigning a regulatory value to the hydrocarbon fuel based upon a one or more carbon intensity values characterizing the production and use of the hydrocarbon, including one or more values characterizing the sequestration of atmospheric carbon dioxide in the geologic formation(s).

In still another aspect, systems for producing and/or supplying a low CI fuel disclosed here provide a computerized method of using a data processor having a memory to account for carbon flows and determine a regulatory value for a hydrocarbon fuel. The method includes: (i) storing, in memory, a set of one or more values characterizing carbon flows associated with the production and use of hydrocarbon fuel(s), wherein one or more of the values represent injection of a fluid containing atmospheric carbon dioxide—captured either directly via industrial processes or indirectly via photosynthesis and industrial processing of resultant biomass and/or carbon dioxide captured from industrial processes that may otherwise be emitted to the atmosphere—into the geologic formation(s) from which raw hydrocarbons are produced such that the injected atmospheric carbon dioxide is sequestered in the geologic formation(s) and mitigates anthropogenic GHG emission, including but not limited to other emissions resulting from production and use of the hydrocarbon fuel; (ii) calculating, using the data processor, a regulatory value for the hydrocarbons from the stored carbon flow values; and (iii) trading the hydrocarbon fuel having the regulatory value, a credit generated as a function of the regulatory value, or both the hydrocarbon fuel and the credit.

In still another aspect, systems for producing and/or supplying a low CI fuel provide a method of engineering a carbon cycle for hydrocarbon fuel production and use. The method includes: (i) arranging the production of hydrocarbon fuel(s), wherein a fluid containing atmospheric carbon dioxide—captured either directly via industrial processes or indirectly via photosynthesis and industrial processing of resultant biomass and/or carbon dioxide captured from industrial processes that may otherwise be emitted to the atmosphere—is injected into the geologic formation(s) from which raw hydrocarbons are produced such that the injected atmospheric carbon dioxide is sequestered in the geologic formation(s) and mitigates anthropogenic GHG emission, including but not limited to other emissions resulting from production and use of the hydrocarbon fuel; (ii) assigning a regulatory value to the biofuel from a set of one or more carbon intensity values characterizing the production and use of the hydrocarbon, including one or more values characterizing the sequestration of atmospheric carbon dioxide in the geologic formation from which raw hydrocarbons are produced; and (iii) trading the hydrocarbon fuel having the regulatory value, a credit generated as a function of the regulatory value, or both the hydrocarbon fuel and the credit.

In still another aspect, systems for producing and/or supplying a low CI fuel provide a method of manufacturing a hydrocarbon fuel. The method includes: (i) injecting a fluid containing atmospheric carbon dioxide into hydrocarbon containing geologic formation(s) such that a portion of atmospheric carbon dioxide is sequestered in the geologic formation(s) and mitigates anthropogenic GHG emission; (ii) producing raw hydrocarbons from geologic formation(s) into which the atmospheric carbon dioxide containing fluid was injected and refining raw hydrocarbons into finished hydrocarbon fuels; (iii) assigning a regulatory value to the hydrocarbon fuel based upon a one or more carbon intensity values characterizing the production and use of the hydrocarbon, including one or more values characterizing the sequestration of atmospheric carbon dioxide in the geologic formation(s); and (iv) trading the bio fuel having the regulatory value, a credit generated as a function of the regulatory value, or both the hydrocarbon fuel and the credit.

Turning to FIG. 3A (and also with reference to Table 1, below), an example scheme for accounting for carbon flows and determining a regulatory value of a low CI hydrocarbon fuel using CI values (e.g., in $gCO_2e/MJ$) is illustrated. More specifically, FIG. 3A illustrates an example "well-to-wheel" accounting of CI values included with a well-to-tank path and tank-to-wheel path. Table 1, moreover, may illustrate an example accounting of CI values for low CI hydrocarbon fuel production and/or supply using a natural gas fueled industrial air capture of atmospheric carbon dioxide.

TABLE 1

Emissions summary for low CI hydrocarbon production using Natural Gas fueled industrial air capture

| LCA emissions accounting component | Emissions (gCO2e/MJ) | |
|---|---|---|
| Well to tank | | |
| Atmospheric CO2 capture | −56.24 | Computed below, Assumes full benefit allocated to transporation fuel product |
| CO2 transportation | 1.00 | Placeholder value, but variable dependong on scale, distance, and mode of transport |
| Crude Recovery | 6.93 | |
| Crude Transport | 1.14 | |
| Crude Refining | 13.72 | |
| Transport | 0.36 | |
| Total well to tank | −33.09 | |
| Tank to wheel | | |
| Total tank to wheel | 72.91 | |
| Total well to wheel | 39.82 | |
| Example of computational algorithm for defining emissions accounting credits produced via low Cl hydrocarbon production applied in the context of a Regulatory Low Carbon Fuel Standard Industrial air capture | | |
| Algorithm parameters | | |
| CO2 sequestered per barrel hydrocarbons produced [tCO2e/bbl] | 0.5 | |
| Hydrocarbon Lower Heating Value [GJ/bbl] | 5.5 | |
| Conversion factor: MJ per GJ | 1000 | |
| Total CO2 sequestered [gCO2e/MJ hydrocarbons] | 90.91 | |
| Atmospheric CO2 sequestered [gCO2e/MJ hydrocarbons] | 60.61 | Assumes: 0.5 tCO2e captured from NG for every 1 tCO2e captured from the atmosphere |
| Fuel combustion CO2 sequestered [gCO2e/MJ hydrocarbons] | 30.30 | Same as above |
| Fuel combustion emissions to atmosphere [gCO2e/MJ hydrocarbons] | 3.37 | Assumes 90% fuel combustion CO2 capture rate |
| Emissions from upstream fuel supply [gCO2e/MJ hydrocarbons] | 1 | Placeholder value |
| Emissions accounting credit for Atmospheric CO2 sequestration | 56.24 | Computed as Atmospheric CO2 sequestered minus emissions from fuel combustion and upstream fuel supply |

In some aspects, the CI value for the atmospheric capture of carbon dioxide may be a negative value, e.g., a "credit," relative to the CI values for other aspects of the illustrated well-to-tank path. For instance, the CI value for the atmospheric capture of carbon dioxide may be determined according to the amount of atmospheric carbon dioxide sequestered per barrel of crude produced (in $gCO_2e/bbl$) minus a sum of CI values for (1) emissions from natural gas combustion in atmospheric carbon dioxide capture and (2) emissions associated with transport of such natural gas. In one example accounting, a total amount of atmospheric carbon dioxide sequestered per mega joules of crude produced is about 60.6. A CI value of emissions from natural gas combustion in atmospheric carbon dioxide capture is about 3.37. A CI value of emissions associated with transport of such natural gas is about 1 (as an estimated value). Thus, the CI value for the atmospheric capture of carbon dioxide is about 56.2 (as a credit or negative value).

The CI value for carbon dioxide transportation may be determined on the basis of, for example, scale, distance, and mode of transport. In this example, that value may be 1 $gCO_2e/MJ$ as an estimate. The CI values for crude recovery, crude transport, crude refining, and refined fuel transportation and storage may be substantially similar to the values provided above in a conventional scheme: 6.9 for crude recovery, 1.1 for crude transport, 13.7 for crude refining, and 0.4 for refined fuel transport (in $gCO_2e/MJ$).

As illustrated, therefore, the total CI value for the well-to-tank path is determined by subtracting the CI value of atmospheric capture of carbon dioxide from the sum of the CI values for carbon dioxide transportation, crude recovery, crude transport, crude refining, and transport and/or storage of refined fuel. The well-to-tank value, according to the above example accounting, therefore, is about 33.1 $gCO_2e/MJ$ in credit (e.g., a negative value). As noted above, the CI value for the tank-to-wheel CI value is about 72.9 $gCO_2e/MJ$, thereby giving a well-to-wheel CI value in this example of about 39.8. Accordingly, the total estimated well-to-wheel CI value for low CI hydrocarbon fuel production and/or supply using a natural gas fueled industrial air capture of atmospheric carbon dioxide is 39.8 compared to a total estimated well-to-wheel CI value for conventional schemes for producing and/or supplying hydrocarbon fuel of 95.1.

As another example of a scheme for accounting for carbon flows and determining a regulatory value of a low CI hydrocarbon fuel using CI values using FIG. 3A (and now with reference to Table 2, below), an example accounting of CI values for low CI hydrocarbon fuel production and/or supply using a biomass fueled industrial air capture of atmospheric carbon dioxide is illustrated.

mode of transport. In this example, that value may be about 0.1 $gCO_2e/MJ$ as an estimate. The CI values for crude recovery, crude transport, crude refining, and refined fuel transpor-

TABLE 2

Emissions summary for low CI hydrocarbon production using biomass fueled industrial air capture

| LCA emissions accounting component | Emissions (gCO2e/MJ) | |
|---|---|---|
| Well to tank | | |
| Atmospheric CO2 capture | −89.91 | Computed below |
| CO2 transportation | 0.10 | Placeholder value, but variable dependong on scale, distance, and mode of transport |
| Crude Recovery | 6.93 | |
| Crude Transport | 1.14 | |
| Crude Refining | 13.72 | |
| Transport | 0.36 | |
| Total well to tank | −67.66 | |
| Tank to wheel | | |
| Total tank to wheel | 72.91 | |
| Total well to wheel | 5.25 | |
| Example of computational algorithm for defining emissions accounting credits produced via low CI hydrocarbon production applied in the context of a Regulatory Low Carbon Fuel Standard - Biomass fueled industrial air capture | | |
| Algorithm parameters | | |
| CO2 sequestered per barrel hydrocarbons produced [tCO2e/bbl] | 0.5 | |
| Hydrocarbon Lower Heating Value [GJ/bbl] | 5.5 | |
| Conversion factor: MJ per GJ | 1000 | |
| Total CO2 sequestered [gCO2e/MJ hydrocarbons] | 90.91 | |
| Atmospheric CO2 sequestered from Air capture [gCO2e/MJ hydrocarbons] | 60.61 | Assumes: 0.5 tCO2e captured from NG for every 1 tCO2e captured from the atmosphere, which includes energy required for CO2 compression |
| Fuel combustion CO2 from biogenic sources sequestered [gCO2e/MJ hydrocarbons] | 30.30 | Same as above |
| Fuel combustion emissions from biogenic sources to atmosphere [gCO2e/MJ hydrocarbons] | 3.37 | Assumes 90% fuel combustion CO2 capture rate—does not affect total CO2 emissions due to biogenic source |
| Emissions from upstream fuel supply [gCO2e/MJ hydrocarbons] | 1 | Place holder |
| Emissions accounting credit for Atmospheric CO2 sequestration | 89.91 | Computed as Atmospheric CO2 from industrial air capture plus fuel combustion CO2 from biogenic sources sequestered minus emissions from fuel combustion and upstream fuel supply |

As noted above, the CI value for the atmospheric capture of carbon dioxide is a negative value, e.g., a "credit," relative to the CI values for other aspects of the illustrated well-to-tank path. For instance, the CI value for the atmospheric capture of carbon dioxide may be determined according to the amount of atmospheric carbon dioxide sequestered per barrel of crude produced (in $gCO_2e/bbl$) plus a fuel combustion carbon dioxide from biogenic sources emissions minus the emissions associated with fuel combustion and an upstream fuel supply. In one example accounting, a total amount of atmospheric carbon dioxide sequestered per mega joules of crude produced is about 60.6. A CI value of a fuel combustion carbon dioxide sequestered from biogenic sources emissions is about 30.3. A CI value of emissions associated with fuel combustion and an upstream fuel supply is about 1 (as an estimated value). Because biogenic carbon dioxide was recently captured from the atmosphere (e.g., via photosynthesis, the CI value for the atmospheric capture of carbon dioxide is about 89.9 $gCO_2e/MJ$ (as a credit or negative value).

The CI value for carbon dioxide transportation may be determined on the basis of, for example, scale, distance, and mode of transport. In this example, that value may be about 0.1 $gCO_2e/MJ$ as an estimate. The CI values for crude recovery, crude transport, crude refining, and refined fuel transportation and storage may be substantially similar to the values provided above in a conventional scheme: 6.9 for crude recovery, 1.1 for crude transport, 13.7 for crude refining, and 0.4 for refined fuel transport (in $gCO_2e/MJ$).

As illustrated, therefore, the total CI value for the well-to-tank path is determined by subtracting the CI value of atmospheric capture of carbon dioxide from the sum of the CI values for carbon dioxide transportation, crude recovery, crude transport, crude refining, and transport and/or storage of refined fuel. The well-to-tank value, according to the above example accounting, therefore, is about 67.7 $gCO_2e/MJ$ in credit (e.g., a negative value). As noted above, the CI value for the tank-to-wheel CI value is about 72.9 $gCO_2e/MJ$, thereby giving a well-to-wheel CI value of about 5.2. Accordingly, the total estimated well-to-wheel CI value for low CI hydrocarbon fuel production and/or supply using a biomass fueled industrial air capture of atmospheric carbon dioxide is 5.2 compared to a total estimated well-to-wheel CI value for conventional schemes for producing and/or supplying hydrocarbon fuel of 95.1.

Turning to FIG. 3B (and with reference to Table 3, below), another example scheme for accounting for carbon flows and determining a regulatory value of a low CI hydrocarbon fuel using CI values (e.g., in gCO$_2$e/MJ) is illustrated. More specifically, FIG. 3B illustrates an example "well-to-wheel" accounting of CI values included with a well-to-tank path and tank-to-wheel path. Table 3, moreover, may illustrate an example accounting of CI values for low CI hydrocarbon fuel production and/or supply using a biomass carbon capture and storage ("CCS") with electricity as a co-product.

sions consequence of substituting resulting electricity for conventionally produced electricity may be attributed to the hydrocarbon using, for example, system expansion and/or displacement LCA methodologies. Use of allocation LCA methodologies is also possible, though not discussed in this example. This is computed as the product of electricity produced per unit hydrocarbon fuels and the difference in emissions intensity (e.g., CI value) of the produced electricity and

TABLE 3

Emissions summary for low Cl hydrocarbon production using biomass CCS with electricity co-product

| LCA emissions accounting component | Emissions (gCO2e/MJ) | |
|---|---|---|
| Well to tank | | |
| Atmospheric CO2 capture | −89.91 | Computed below |
| Atmospheric CO2 capture co-product credit | −30.30 | Computed below |
| CO2 transportation | 1.00 | Placeholder value, but variable depending on scale, distance, and mode of transport |
| Crude Recovery | 6.93 | |
| Crude Transport | 1.14 | |
| Crude Refining | 13.72 | |
| Transport | 0.36 | |
| Total well to tank | −97.06 | |
| Tank to wheel | | |
| Total tank to wheel | 72.91 | |
| Total well to wheel | −24.15 | |

Example of computational algorithm for defining emissions accounting credits produced via low Cl hydrocarbon production applied in the context of a Regulatory Low Carbon Fuel Standard - Biomass-CCS with electricity co-product

| Algorithm parameters | Value | Notes |
|---|---|---|
| Atmospheric CO2 sequestered | | |
| CO2 sequestered per barrel hydrocarbons produced [tCO2e/bbl] | 0.5 | |
| Hydrocarbon Lower Heating Value [GJ/bbl] | 5.5 | |
| Conversion factor: MJ per GJ | 1000 | |
| Total CO2 sequestered - all from biogenic sources [gCO2e/MJ hydrocarbons] | 90.91 | |
| Biomass combustion emissions to atmosphere [gCO2e/MJ hydrocarbons] | 10.10 | Assumes 90% fuel combustion CO2 capture rate - does not affect total CO2 emissions due to biogenic source |
| Emissions from upstream fuel supply [gCO2e/MJ hydrocarbons] | 1 | Assumed |
| Total credit for atmospheric CO2 sequestered | 89.91 | |
| Co-product credit | | |
| Biomass CO2e produced [g/MJ hydrocarbons] | 101.01 | |
| Biomass carbon content [mass fraction] | 0.50 | |
| Biomass burned [g/MJ hydrocarbons] | 55.10 | Computed as product of CO2e produced, mass ratio of C:CO2 (12/44), and inverse of C content of biomass |
| Biomass heating value (HHV) [kJ/g] | 15.00 | |
| Biomass to electricity conversion efficiency with CCS [HHV basis] | 0.20 | Includes parasitic loads for CO2 compression |
| Conversion factor: kJ per kWh | 3500.00 | |
| Electricity generated [kWh/bbl] | 0.05 | Computed as the inverse of the conversion factor multiplied by the product of the preceeding three factors |
| Carbon intensity of electricity generated [gCO2e/kWh] | 0 | Assumes all emissions are biogenic and upstream emissions of fuel supply are accounted for above |
| Carbon intensity of conventional electricity displaced [gCO2e/kWh] | 650 | Approximate value for US average (in 2005) from an ICFS presentation on fuel electricity |
| Total co-product credit [gCO2e/MJ hydrocarbons] | 30.30 | |

For instance, electricity produced in the supply of carbon dioxide for carbon capture and storage may be considered a co-product of the hydrocarbon fuels. In this case, the emissions a conventional source of electricity (such as, for example, a coal-fired power plant). If the electricity is produced using biomass fuel, then the carbon dioxide sequestered constitutes atmospheric carbon dioxide, which was fixed in the biomass via photosynthesis. Residual emissions from electricity production (e.g., carbon dioxide not captured) may be assigned a net emissions value of zero in certain contexts. An appropriate baseline source of electricity might be determined, as explained in the example of FIG. 3B below.

A wide variety of technologies are available for using biomass to supply carbon dioxide for hydrocarbon production with an electricity co-product. Further, it is possible to produce a wide variety of co-products other than electricity in the process of using biomass to supply carbon dioxide for hydrocarbon production including but not limited to: liquid fuels using thermochemical (e.g., Fischer-Tropsche synthesis) or biochemical (e.g., fermentation) processes; chemicals; solid fuels (e.g., charcoal); soil amendments (e.g., bio-char); or the co-products noted below in the context of supplying carbon dioxide from fossil carbon sources. Many types of biomass could be used for supplying carbon dioxide for hydrocarbon production including but not limited to: agricultural residues; forestry residues; mill wastes; urban wastes; municipal solid wastes; clippings, trimmings, or other "green wastes"; or landfill deposits, with associated landfill gas production. Multiple types of biomass, technologies, and co-products may be used simultaneously or in other combinations for supplying carbon dioxide for hydrocarbon production.

If the electricity is produced using coal fuel, then the carbon dioxide sequestered does not constitute atmospheric carbon dioxide, and so no negative CI value can be granted for atmospheric carbon dioxide sequestration. However, an emissions accounting credit (e.g., a negative CI value) may be granted for displacing conventional electricity generation with the reduced CI electricity co-product of hydrocarbon production. The emissions intensity of the produced electricity can be computed as the combustion emissions to the atmosphere plus the emissions associated with fuel supply divided by the associated electricity produced. If the coal fired power plant with CCS supplying the coal is displacing electricity that would be provided by a conventional coal fired power plant without CCS, then the difference in these CIs may be the appropriate basis for computing net emissions effects from using the electricity co-product. This can yield a significant co-product credit.

A wide variety of technologies are available for using fossil carbon sources, such as coal in the present discussion, to supply carbon dioxide for hydrocarbon production with an electricity co-product. Further, it is possible to produce a wide variety of co-products other than electricity in the process of using fossil carbon sources to supply carbon dioxide for hydrocarbon production including but not limited to: liquid fuels (e.g., via Fischer-Tropsche synthesis); fertilizers; cement; mineral products (e.g., lime and soda ash) metals (e.g., iron and steel, aluminum, zinc, or lead); other chemicals (e.g., ammonia, petrochemicals, urea, fertilizer, and titanium dioxide); or steam for a variety of processes, including for thermally enhanced oil recovery, steam injection bitumen production, and/or bitumen upgrading. Many types of fossil carbon sources could be used for supplying carbon dioxide for hydrocarbon production including but not limited to: coal, natural gas, and petroleum. Multiple types of fossil carbon sources, technologies, and co-products may be used simultaneously or in other combinations for supplying carbon dioxide for hydrocarbon production.

Turning to FIG. 3B again, the CI value for the atmospheric capture of carbon dioxide may be substantially the same CI value (e.g., 89.9 $gCO_2e/MJ$) as that determined above with reference to FIG. 3A and the example accounting of CI values for low CI hydrocarbon fuel production and/or supply using a biomass fueled industrial air capture of atmospheric carbon dioxide. As described above, there is also a CI value credit for electricity generated as a co-product from atmospheric carbon dioxide capture. This CI value may be determined by first determining an amount of electricity generated (in kWh/MJ) as a co-product, which can be determined according to the biomass burned (in g/MJ crude) and the biomass heating value (in kJ/g). More specifically, the electricity generated as a co-product is equal to the biomass burned times the biomass heating value times a biomass to electricity conversion efficiency with CSS divided by a kJ to kWh conversion factor. Assuming that the biomass burned is equal to the total carbon dioxide sequestered from biogenic sources plus the biomass combustion emissions to the atmosphere (taking into account the mass ratio of carbon to carbon dioxide and the carbon content of biomass), then the biomass burned is about 101 g/MJ. Also assuming a HHV of biomass as 15 kJ/g, then the electricity generated is about 0.05 kWh/MJ crude.

In order to determine the CI value (credit) of the electricity co-product, the CI value of conventional electricity generation must be approximated—in this example, it is about 660 $gCO_2e$/kWh. Thus, the CI value credit is equal to the CI value of conventional electricity generation times the amount of co-produced electricity (e.g., 0.05 kWh/MJ crude), or about 30.3 $gCO_2e/MJ$ crude.

The total CI credit value is thus the sum of the CI value due to the atmospheric capture of carbon dioxide (e.g., 89.9 $gCO_2e/MJ$) and the CI value of conventional electricity generation times the amount of co-produced electricity (e.g., 0.05 kWh/MJ crude), or about 30.3 $gCO_2e/MJ$ crude. This sum is about 120.2 $gCO_2e/MJ$.

The CI value for carbon dioxide transportation may be determined relative to, for example, scale, distance, and mode of transport. In this example, that value may be 1 $gCO_2e/MJ$ as an estimate. The CI values for crude recovery, crude transport, crude refining, and refined fuel transportation and storage may be substantially similar to the values provided above in a conventional scheme: 6.9 for crude recovery, 1.1 for crude transport, 13.7 for crude refining, and 0.4 for refined fuel transport (in $gCO_2e/MJ$).

As illustrated, therefore, the total CI value for the well-to-tank path is determined by subtracting the sum of the CI values of atmospheric capture of carbon dioxide and the atmospheric carbon dioxide capture co-products from the sum of the CI values for carbon dioxide transportation, crude recovery, crude transport, crude refining, and transport and/or storage of refined fuel (values shown above). The well-to-tank value, according to the above example accounting, therefore, is about 97.1 $gCO_2e/MJ$ in credit (e.g., a negative value). As noted above, the CI value for the tank-to-wheel CI value is about 72.9 $gCO_2e/MJ$. Accordingly, the total estimated well-to-wheel CI value for low CI hydrocarbon fuel production and/or supply using a biomass CSS with electricity as a co-product is 24.2 $gCO_2e/MJ$ in credit (negative value) compared to a total estimated well-to-wheel CI value for conventional schemes for producing and/or supplying hydrocarbon fuel of 95.1 $gCO_2e/MJ$ (positive value).

In a related example to that described above with reference to FIG. 3B (and now with reference to Table 4, below), this figure and table may also illustrate an example accounting of CI values for low CI hydrocarbon fuel production and/or supply using a coal electricity with CCS (e.g., with electricity as a co-product). In this related example, however, there is no capture of atmospheric carbon dioxide. Thus there is no credit for capturing atmospheric carbon dioxide and there is no sequestration of captured atmospheric carbon dioxide. Instead, there is a co-product credit for the electricity generated by a coal plant from which emitted carbon dioxide is sequestered. For instance, the CI value of the total carbon dioxide sequestered (e.g., all from fossil sources) is about 90.9 g$CO_2$e/MJ hydrocarbons produced. The coal combustion emissions to the atmosphere is assumed to be ~11% more than the sequestered carbon dioxide, for the case that there is an assumed 90% fuel combustion carbon dioxide capture rate in this example.

TABLE 4

Emissions summary for low CI hydrocarbon production using coal electricity with CCS

| LCA emissions accounting component | Emissions (gCO2e/MJ) | |
| --- | --- | --- |
| Well to tank | | |
| Atmospheric CO2 capture | 0.00 | Computed below |
| Atmospheric CO2 capture co-product credit | −75.77 | Computed below |
| CO2 transportation | 1.00 | Placeholder value, but variable dependong on scale, distance, and mode of transport |
| Crude Recovery | 6.93 | |
| Crude Transport | 1.14 | |
| Crude Refining | 13.72 | |
| Transport | 0.36 | |
| Total well to tank | −52.52 | |
| Tank to wheel | | |
| Total tank to wheel | 72.81 | |
| Total well to wheel | 20.29 | |

Example of computational algorithm for defining emissions accounting credits produced via low CI hydrocarbon production applied in the context of a Regulatory Low Carbon Fuel Standard - Biomass-CCS with electricity co-product

| Algorithm parameters | Value | Notes |
| --- | --- | --- |
| Atmospheric CO2 sequestered | | |
| CO2 sequestered per barrel hydrocarbons produced [tCO2e/bbl] | 0.5 | |
| Hydrocarbon Lower Heating value [GJ/bbl] | 5.5 | |
| Conversion factor: MJ per GJ | 1000 | |
| Total CO2 sequestered - all from fossil sources [gCO2e/MJ hydrocarbons] | 90.91 | |
| Coal combustion emissions to atmosphere [gCO2e/MJ hydrocarbons] | 10.10 | Assumes 90% fuel combustion CO2 capture rate - does not affect total CO2 emissions due to biogenic source |
| Emissions from upstream fuel supply [gCO2e/MJ hydrocarbons] | 10 | Assumed |
| Total credit for atmospheric CO2 sequestered | 0.00 | None of the sequestered carbon is from the atmosphere |
| Co-product credit | | |
| Coal CO2e produced [g/MJ hydrocarbons] | 101.01 | |
| Coal carbon content [mass fraction] | 0.75 | |
| Coal burned [g/MJ hydrocarbons] | 36.73 | Computed as product of CO2e produced, mass ratio of C:CO2 (12/44) and inverse of C content of biomass |
| Coal heating value (HHV) [kJ/g] | 29.50 | |
| Coal to electricity conversion efficiency with CCS [HHV basis] | 0.27 | |
| Conversion factor: kJ per kWh | 3600.00 | |
| Electricity generated [kWh/bbl] | 0.00 | Computed as the inverse of the conversion factor multiplied by the product of the preceeding three factors |
| Carbon intensity of electricity generated [gCO2e/kWh] | 252 | Assumes all emissions are biogenic and upstream emissions of fuel supply are accounted for above |
| Carbon intensity of conventional electricity displaced [gCO2e/kWh] | 1220 | Approximate value for coal steam plant from an ICFS presentation on fuel electricity |
| Total co-product credit [gCO2e/MJ hydrocarbons] | 75.77 | |

The CI value of the electricity generated, therefore, is the sum of the CI value of the coal combustion emissions to the atmosphere (in this example, about 10.1 gCO$_2$e/MJ) plus an assumed CI value for upstream fuel supply emissions (in this example, assumed to be about 10 gCO$_2$e/MJ) divided by the electricity generated per barrel of produced hydrocarbons (in this example, about 0.5 kWh/W. Thus, the CI of the electricity generated is about 252 gCO$_2$e/MJ.

In order to determine the CI value (credit) of the electricity co-product, the CI value of conventional electricity generation must be approximated—in this example, it is about 1200 gCO$_2$e/kWh (assuming an approximate value for a coal steam plant). The total CI credit value is thus the difference between the CI of the electricity generated (e.g., 252 gCO$_2$e/MJ) and the CI value of conventional electricity generation (e.g., 1200 gCO$_2$e/kWh) times the amount of co-produced electricity (e.g., 0.05 kWh/MJ crude), or about 75.8 gCO$_2$e/MJ.

The CI value for carbon dioxide transportation may be determined relative to, for example, scale, distance, and mode of transport. In this example, that value may be 1 gCO$_2$e/MJ as an estimate. The CI values for crude recovery, crude transport, crude refining, and refined fuel transportation and storage may be substantially similar to the values provided above in a conventional scheme: 6.9 for crude recovery, 1.1 for crude transport, 13.7 for crude refining, and 0.4 for refined fuel transport (in gCO$_2$e/MJ).

As illustrated, therefore, the total CI value for the well-to-tank path is determined by subtracting the CI value (credit) of the electricity co-product from the sum of the CI values for carbon dioxide transportation, crude recovery, crude transport, crude refining, and transport and/or storage of refined fuel (values shown above). The well-to-tank value, according to this related example accounting, therefore, is about 52.6 gCO$_2$e/MJ in credit (e.g., a negative value). As noted above, the CI value for the tank-to-wheel CI value is about 72.9 gCO$_2$e/MJ. Accordingly, the total estimated well-to-wheel CI value for low CI hydrocarbon fuel production and/or supply using a coal electricity with CCS is 20.3 gCO$_2$e/MJ, which is about 75 gCO$_2$e/MJ less than the total estimated well-to-wheel CI value for conventional schemes for producing and/or supplying hydrocarbon fuel of 95.1 gCO$_2$e/MJ (positive value).

As another example illustrated by FIG. 3B (and now with reference to Table 5, below), this figure and table may illustrate an example accounting of CI value for low CI hydrocarbon fuel production and/or supply using ethanol fermentation offgas. In this example, the atmospheric carbon dioxide capture co-product may be assumed to be zero, as ethanol plant operations may not be affected other than a plant power load increased for carbon dioxide compression and sequestration, which are accounted for in the CI value of the atmospheric capture of carbon dioxide.

TABLE 5

Emissions summary for low Cl hydrocarbon production using ethanol fermentation offgas

| LCA emissions accounting component | Emissions (gCO2e/MJ) | |
| --- | --- | --- |
| Well to tank | | |
| Atmospheric CO2 capture | −83.41 | Computed below |
| Atmospheric CO2 capture co-product credit | 0.00 | Assumed to be zero |
| CO2 transportation | 1.00 | Placeholder value, but variable dependong on scale, distance, and mode of transport |
| Crude Recovery | 6.93 | |
| Crude Transport | 1.14 | |
| Crude Refining | 13.72 | |
| Transport | 0.36 | |
| Total well to tank | −60.26 | |
| Tank to wheel | | |
| Total tank to wheel | 72.91 | |
| Total well to wheel | 12.65 | |

Example of computational algorithm for defining emissions accounting credits produced via low Cl hydrocarbon production applied in the context of a Regulatory Low Carbon Fuel Standard - Ethanol fermentation offgas

| Algorithm parameters | Value | Notes |
| --- | --- | --- |
| Atmospheric CO2 sequestered | | |
| CO2 sequestered per barrel hydrocarbons produced [tCO2e/bbl] | 0.5 | |
| Hydrocarbon Lower Heating Value [GJ/bbl] | 5.5 | |
| Conversion factor: MJ per GJ | 1000 | |
| Total CO2 sequestered - all from ethanol offgases [gCO2e/MJ hydrocarbons] | 90.91 | |
| Carbon intensity of electricity [gCO2e/kWh] | 660.00 | |
| Electricity required for ethanol offgas compression [kWh/tCO2e] | 125.00 | |
| Fossil CO2 emissions from CO2 compression [gCO2e/MJ hydrocarbons] | 7.50 | Assumes zero energy required for CO2 capture |
| Marginal Emissions from upstream fuel supply [gCO2e/MJ hydrocarbons] | 0 | Assumes upstream emissions are allocated to the ethanol production/no change in upstream emissions from implementing CO2 capture |
| Total credit for atmospheric CO2 sequestered | 83.41 | |

TABLE 5-continued

Co-product credit

| | | |
|---|---|---|
| Total co-product credit [gCO2e/MJ hydrocarbons] | 0.00 | Assumed to be zero, as ethanol plant emissions are not affected other than power load for CO2 compression and CO2 sequestration, both captured above. |

In this example, the CI value for the atmospheric capture of carbon dioxide may be determined by, for instance, subtracting an amount of carbon dioxide emissions (in g$CO_2$e/MJ) for carbon dioxide compression from a CI value representing the total carbon dioxide sequestered. The CI value representing the total carbon dioxide sequestered is approximately equal to the amount of carbon dioxide sequestered per barrel of hydrocarbon produced (in this example, 0.5 t$CO_2$e/bbl) divided by the hydrocarbon's lower heating value (in this example, about 5.5 gJ/bbl) and then multiplied by a conversion factor to convert the units into g$CO_2$e/MJ hydrocarbons produced. In this example, therefore, the total atmospheric carbon dioxide sequestered is about 90.9 g$CO_2$e/MJ. Thus, the CI value for the atmospheric capture of carbon dioxide is 90.9 minus 7.5 g$CO_2$e/MJ, which represents (in this example) the CI value for carbon dioxide compression, or about 83.4 g$CO_2$e/MJ in credit (e.g., a negative value).

The CI value for carbon dioxide transportation may be determined relative to, for example, scale, distance, and mode of transport. In this example, that value may be 1 g$CO_2$e/MJ as an estimate. The CI values for crude recovery, crude transport, crude refining, and refined fuel transportation and storage may be substantially similar to the values provided above in a conventional scheme: 6.9 for crude recovery, 1.1 for crude transport, 13.7 for crude refining, and 0.4 for refined fuel transport (in g$CO_2$e/MJ).

As illustrated, therefore, the total CI value for the well-to-tank path is determined by subtracting the CI value of atmospheric capture of carbon dioxide from the sum of the CI values for carbon dioxide transportation, crude recovery, crude transport, crude refining, and transport and/or storage of refined fuel (values shown above). The well-to-tank value, according to the above example accounting, therefore, is about 60.3 g$CO_2$e/MJ in credit (e.g., a negative value). As noted above, the CI value for the tank-to-wheel CI value is about 72.9 g$CO_2$e/MJ. Accordingly, the total estimated well-to-wheel CI value for low CI hydrocarbon fuel production and/or supply using ethanol fermentation offgas is 12.7 g$CO_2$e/MJ (positive value) compared to a total estimated well-to-wheel CI value for conventional schemes for producing and/or supplying hydrocarbon fuel of 95.1 g$CO_2$e/MJ (positive value).

Figure 4:
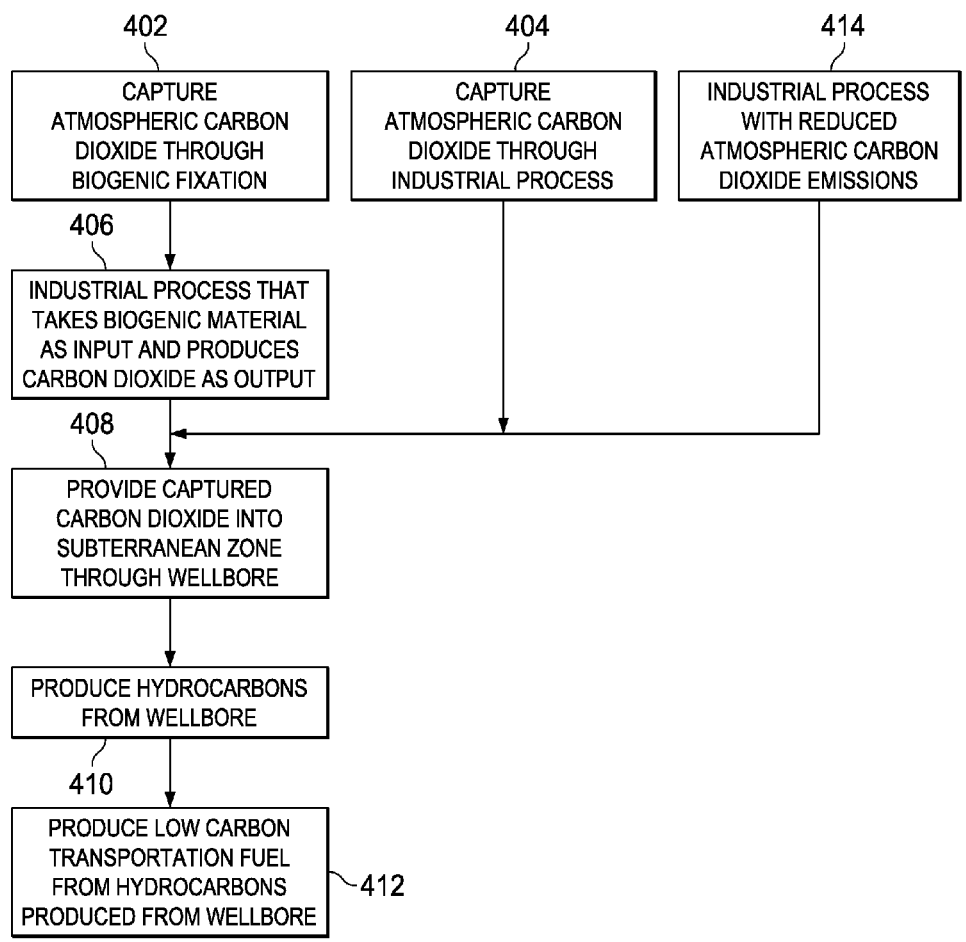
FIG. 4 illustrates an example process for producing and/or supplying a low-carbon hydrocarbon fuel according to the present disclosure.

FIG. 4 illustrates an example process 400 for producing and/or supplying a low-carbon transportation fuel. In some aspects, the process 400 may be implemented, at least in part, by all or portions of the system 100 and the system(s) described with reference to FIGS. 2A-2C. Alternatively, or additionally, the process 400 may be implemented by and/or with a system for producing and/or supplying a low-carbon transportation fuel in accordance with the present disclosure.

At step 402, atmospheric carbon dioxide is captured through biogenic fixation (e.g., photosynthesis). In step 404, atmospheric carbon dioxide is captured through an industrial process. At step 406, an industrial process occurs that takes biogenic material (e.g., biomass) as input and produces carbon dioxide as output. In step 414, an industrial process may have reduced carbon dioxide emissions. As illustrated, each of steps 402, 404, and 414 describe a distinct step in capturing atmospheric carbon dioxide. For example, in step 402, atmospheric carbon dioxide is captured through biological fixation via photosynthesis. In step 404, atmospheric carbon dioxide is captured through an industrial process. For example, step 404 may include the capture of atmospheric carbon dioxide through one or more processes described with reference to FIGS. 2A-2C. Further, in step 414, fossil-generated carbon dioxide may be captured from an industrial application (e.g., coal powered electricity generation using a biomass CCS).

For example, in some embodiments, step 402 may include capturing atmospheric carbon dioxide through fermentation off-gases from ethanol production. Step 402 may also include biomass combustion with CCS, either via oxyfuel or post-combustion capture with amine solvents. Step 402 may also include biomass co-combustion with fossil fuels (e.g., coal) with CCS such that a fraction of resultant carbon dioxide is from biomass.

More specifically, in some embodiments, biomass may have important similarities with fossil fuels (particularly coal), including conversion technologies and the range of energy products that can be generated, including dispatchable, base-load electricity as well as liquid and gaseous fuels. As a result, the technological routes for CCS applications with fossil fuel systems could be applied to biomass energy systems, and biological processes, such as bio-ethanol fermentation, provide additional CCS opportunities for biomass.

In some embodiments, carbon dioxide can be separated from other combustion products, for example by using amine based solvents or burning the fuels with concentrated carbon dioxide so that resulting combustion products are primarily carbon dioxide and water, which can be separated by condensing the water. These technological routes to CCS could be integrated with new biomass boiler technologies or retrofitted to existing plants. Alternatively, fossil fueled facilities (e.g., coal-fired power plants) could be retrofitted to co-fire biomass and incorporate CCS such that a portion of the carbon dioxide captured would be from biogenic sources and a portion would be from fossil sources. With sufficiently stringent emissions controls, such a plant could be retrofitted to burn only biomass.

In some embodiments, combustion could be preceded by gasification and/or syngas conditioning with carbon dioxide separation. Technological routes using these basic processes could be integrated with modern and advanced biomass gasification technologies, including for example, indirectly heated, steam-blown systems or oxygen blown systems. Alternatively, technological routes using these basic technologies could be integrated with facilities that co-fire or co-gasify coal and biomass.

Further, carbon dioxide is produced as a byproduct of fermentation in equal molar proportions to ethanol. This nearly pure carbon dioxide stream is normally vented to the atmosphere, but could be captured and compressed for geologic storage. For example, nearly 35 metric tons of carbon dioxide is available for capture (at potentially very low costs) from fermentation of approximately 46 gigaliters ethanol produced annually. Further, bio-ethanol production—particularly in ligno-cellulosic systems—generally also includes combustion, or gasification and combustion, of waste biomass, providing further carbon capture opportunities.

Carbon dioxide may be produced as a byproduct of other biological or thermochemical processes including but not limited to anaerobic digestion, landfill gas production, fermentation into alcohols other than ethanol, hydrothermal treatments/upgrading, liquefaction, pyrolysis, refining, gas conditioning, and many others.

Steps 402 and 404 may be performed simultaneously, sequentially, in varying order, or independently. Further, only one of steps 402 and 404 may be performed to capture atmospheric carbon dioxide. In other instances, the steps 402 and 404 may be performed together or independently. In addition, other steps and/or processes for capturing atmospheric carbon dioxide (not shown here) may be implemented in place of or together with one or more of steps 402 and 404.

In step 408, the captured carbon dioxide is provided into a subterranean zone through a wellbore (or other technique). For example, as shown in FIG. 1, an injection fluid 125 such as carbon dioxide may be used in an enhanced oil recovery operation (or other secondary or tertiary operation) or in a sequestration operation. In any event, at least some of the captured atmospheric carbon dioxide is used in a production and/or sequestration operation.

In step 410, hydrocarbons (e.g., oil, gas, etc.) are produced from the wellbore. For example, as described above with respect to FIG. 1, a production fluid 130 is produced from the same wellbore into which the injection fluid 125 (e.g., captured atmospheric carbon dioxide) is provided. In other instances, an injection fluid may be provided into one or more injection wells in a secondary and/or tertiary production process to help produce hydrocarbons from a production well.

In step 412, a low-carbon hydrocarbon product (e.g., transportation fuel) is produced from the raw hydrocarbon produced from the wellbore. As described above, in some embodiments, using carbon dioxide as an injection fluid may reduce a CI of a transportation fuel refined from a production fluid. For example, the life cycle CI of such a transportation fuel may be reduced due to, for instance, accounting for the removal of the injected carbon dioxide from the atmosphere. In some instances, the transportation fuel is a low-carbon fuel, e.g., a hydrocarbon fuel with a carbon emissions accounting credit that reflects injection of atmospheric carbon dioxide during hydrocarbon production.

None, one, some, or all implementations of the subject matter and the functional operations described in this disclosure can be implemented in digital electronic circuitry, in tangibly-embodied computer software or firmware, in computer hardware, including the structures disclosed in this specification and their structural equivalents, or in combinations of one or more of them. None, one, some, or all implementations of the subject matter described in this specification can be implemented in one or more computer programs, e.g., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

All or portions of the processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made. For example, the steps of process 400 may be performed in a different order than that illustrated herein. Further, process 400 may include more or fewer steps than those illustrated herein.

In addition, there may be other techniques to capture atmospheric carbon that may be utilized in production and/or supply of hydrocarbon fuels with low life-cycle emissions of greenhouse gases per unit fuel, referred to as low carbon intensity. For example, carbon dioxide may be all or part of a gaseous stream provided to a contactor through an inlet. The gaseous stream may be, for example, air, flue gas (e.g., from an industrial facility), exhaust gas (e.g., from a vehicle), or any gaseous stream including a target species such as carbon dioxide. The contactor facilitates absorption of carbon dioxide gas by an aqueous solution (e.g., transfer of the target species carbon dioxide from the gaseous stream to the aqueous solution) in the contactor. In some cases, the aqueous solution is an aqueous buffer solution including one or more buffer species. The aqueous solution may be basic, with a pH greater than 7, greater than 8, greater than 10, or greater than 12, while the buffer species in the aqueous solution can be ionic or neutral, organic or inorganic, or any combination thereof. An initial concentration of buffer species may be selected to achieve a desired equilibrium among species in aqueous solution, including the target species carbon dioxide.

Further, the aqueous solution may include a catalyst selected to increase the rate of absorption of carbon dioxide by the aqueous solution. In an example, carbonic anhydrase is used as a catalyst in aqueous solution, at a concentration of 1-10 g/L, to increase the rate of absorption of carbon dioxide by (or transfer of carbon dioxide to) the aqueous solution.

In an example, a contactor as described above may be configured to achieve cross-current flow of the gaseous stream through the aqueous solution, thereby facilitating absorption of carbon dioxide by the aqueous solution.

A filter may also be part of a system for capturing atmospheric carbon dioxide as described above. For example, an ultrafiltration device or other filtration unit selected to separate the catalyst from the aqueous solution before further processing the aqueous solution may be included. The filter mechanically separates the catalyst from the aqueous stream.

The aqueous stream, substantially free of catalyst, may then be provided (e.g., flows or is pumped) to a membrane separation unit (as described above). In the membrane separation unit, the aqueous stream is processed to separate the buffer species from the dissolved carbon dioxide. This selective separation yields two aqueous stream, with one stream having a greater concentration of buffer species the other stream, which has a greater concentration of dissolved carbon dioxide.

The membrane may be an ion exchange membrane. In an example, the ion exchange membrane is a monovalent anion exchange membrane. The membrane may be used in a process such as, for example, electrodialysis, reverse osmosis, ultrafiltration, microfiltration, nano-filtration, diffusion dialysis, Donnan dialysis, piezodialysis, pervaporation, or another appropriate process.

After the separation of the carbon dioxide from the buffer species, the aqueous stream is provided to an optional mixer and returned to the contactor, or simply returned to the contactor directly. All or part of the aqueous stream may be optionally provided to a gas stripper and subjected to an increased temperature, a decreased pressure, or both, in a temperature swing regeneration process, pressure swing regeneration process, or combination thereof, to further shift the chemical equilibrium between the dissolved form of the carbon dioxide and the carbon dioxide.

Such an atmospheric carbon dioxide capture system can be operated in a continuous mode, in which multiple aqueous streams are combined and provided to the contactor at the same time a carbon dioxide-enriched-gas stream flows from the contactor to the filter. Air or other gaseous components may be vented through an outlet of the contactor to the atmosphere or collected as a gaseous stream. Accordingly, other implementations are within the scope of the following claims.

What is claimed is:

1. A method for reducing a life cycle carbon emissions intensity of a fuel, comprising:
   injecting, into a first wellbore, a carbon dioxide fluid produced from an industrial process that supplies one or more products or services;
   producing a hydrocarbon fluid from a second wellbore to a terranean surface;
   producing a fuel from the produced hydrocarbon fluid; and
   determining that the produced fuel comprises a reduced life cycle carbon emissions intensity value based on a life cycle emissions credit for at least one of the produced hydrocarbon fluid or the produced fuel based on the injection of the carbon dioxide fluid produced from the industrial process that supplies one or more products or services.

2. The method of claim 1, wherein the first and second wellbores are the same wellbore.

3. The method of claim 1, wherein the industrial process comprises a fossil fuel power plant and the one or more products or services comprise electricity.

4. The method of claim 1, wherein the industrial process comprises at least one of a natural gas processing facility, a steel production facility, a cement production facility, an industrial oxyfuel combustion process, a hydrogen production process, or a fertilizer production process.

5. The method of claim 1, further comprising:
   receiving at least a portion of the injected carbon dioxide fluid from the first wellbore at the terranean surface within the hydrocarbon fluid;
   separating the portion of the injected carbon dioxide fluid from the hydrocarbon fluid; and
   re-injecting the separated portion of the injected carbon dioxide fluid into the first wellbore.

6. The method of claim 1, further comprising sequestering at least a portion of the injected carbon dioxide fluid in a subterranean zone.

7. The method of claim 1, the produced fuel comprises the reduced life cycle carbon emissions intensity value, relative to a baseline life cycle carbon emissions intensity value, based on the injection of the carbon dioxide fluid produced from the industrial process.

8. A method for reducing a life cycle carbon emissions intensity of a fuel, comprising:
   capturing a carbon dioxide fluid from an industrial process that supplies one or more products or services; and
   providing the captured carbon dioxide fluid to a container that supplies the captured carbon dioxide fluid as an injectant to a wellbore that produces a hydrocarbon fluid that is refined into a fuel, at least one of the hydrocarbon fluid or the fuel comprising a reduced life cycle carbon emissions intensity value based on at least one of the injectant of carbon dioxide fluid or the industrial process that supplies one or more products or services.

9. The method of claim 8, wherein the industrial process comprises at least one of a carbon intensity reductions or an emissions credit for at least one of the produced hydrocarbon fluid or a fuel produced from the produced hydrocarbon fluid in a refining process.

10. The method of claim 9, wherein the fuel comprises a transportation fuel for consumer vehicles.

11. The method of claim 8, wherein the industrial process comprises at least one of an industrial separation process, a post-combustion separation process, a pre-combustion separation process, or an oxyfuel separation process.

12. The method of claim 11, wherein the industrial separation process comprises a raw material input and a fuel input and an output product that comprises carbon dioxide separable from the output product and compressible into the carbon dioxide fluid.

13. The method of claim 12, wherein the raw material input and the fuel input are a single input to the industrial separation process.

14. The method of claim 11, wherein the post-combustion separation process comprises an air input and a fuel input to a combustion process and an output from the combustion process that comprises heat, power, and a product that comprises carbon dioxide separable from the product and compressible into the carbon dioxide fluid.

15. The method of claim 11, wherein the pre-combustion separation process comprises an air input and a fuel input for a gasification process and an output from the gasification process that comprises hydrogen and carbon dioxide separable from the hydrogen and compressible into the carbon dioxide fluid.

16. The method of claim 11, wherein the oxyfuel separation process comprises an oxygen input and a fuel input to a combustion process and a flue gas output from the combustion process that comprises at least water and carbon dioxide separable from the water and compressible into the carbon dioxide fluid.

17. The method of claim 8, wherein the industrial process comprises at least one of a fossil fuel power plant that generates electricity, a natural gas processing facility, a steel production facility, a cement production facility, an industrial oxyfuel combustion process, a hydrogen production process, or a fertilizer production process.

18. A method for providing transportation fuel, comprising:
receiving a fuel refined from a raw hydrocarbon fluid produced from a geologic formation into which a fluid that contains carbon dioxide captured from an industrial process that supplies one or more products or services is injected; and
providing the fuel as a transportation fuel, the transportation fuel comprising a reduced life cycle carbon emissions intensity value based on its association with at least one of the raw hydrocarbon fluid, the fluid that contains carbon dioxide captured from the industrial process, or the industrial process that supplies the one or more products or services.

19. The method of claim 18, further comprising completing a transaction to effect at least one of:
selling the transportation fuel to a transportation fuel provider;
selling an emissions credit associated with a carbon intensity reduction to a transportation fuel provider or credit trading entity; or
submitting an emissions credit associated with a carbon intensity reduction to a regulatory agency responsible for regulating fuel carbon intensity.

20. The method of claim 18, wherein the industrial process comprises a basis for at least one of a carbon intensity reductions or an emissions credit for at least one of the raw hydrocarbon fluid or the fuel refined from the raw hydrocarbon fluid.

21. The method of claim 18, wherein the industrial process comprises at least one of an industrial separation process, a post-combustion separation process, a pre-combustion separation process, or an oxyfuel separation process.

22. The method of claim 18, wherein the industrial process comprises a fossil fuel power plant and the one or more products or services comprise electricity.

23. The method of claim 18, wherein the industrial process comprises at least one of a natural gas processing facility, a steel production facility, a cement production facility, an industrial oxyfuel combustion process, a hydrogen production process, or a fertilizer production process.

24. A method of producing a hydrocarbon fuel with reduced lifecycle carbon emissions intensity, the method comprising:
receiving a hydrocarbon fluid that has been produced from a geologic formation through a wellbore to a terranean surface, the hydrocarbon fluid produced, at least partially, from the geologic formation with carbon dioxide fluid injected into the geologic formation, the carbon dioxide fluid supplied from an industrial process that supplies one or more products or services; and
refining the received hydrocarbon fluid into a fuel by a refining process, the fuel comprising a reduced lifecycle emissions intensity value based on production of the fuel with at least one of the hydrocarbon fluid or the carbon dioxide fluid associated with the industrial process that supplied one or more products or services.

25. The method of claim 24, wherein the industrial process that supplies one or more products or services comprises a basis for at least one of a carbon intensity reductions or an emissions credit for at least one of the produced hydrocarbon fluid or the fuel produced from the produced hydrocarbon fluid.

26. The method of claim 24, wherein the fuel comprises a low-carbon consumer transportation fuel.

27. The method of claim 24, wherein the industrial process comprises at least one of an industrial separation process, a post-combustion separation process, a pre-combustion separation process, or an oxyfuel separation process.

28. The method of claim 24, wherein the industrial process comprises a fossil fuel power plant and the one or more products or services comprise electricity.

29. A method for reducing a life cycle carbon emissions intensity of a hydrocarbon fluid, comprising:
injecting, into a first wellbore, a carbon dioxide fluid produced from an industrial process that supplies one or more products or services;
producing a hydrocarbon fluid from a second wellbore to a terranean surface;
determining that the produced hydrocarbon fluid comprises a reduced life cycle carbon emissions intensity value based on a life cycle emissions credit associated with the injection of the carbon dioxide fluid produced from the industrial process that supplies one or more products or services.

30. The method of claim 29, wherein the first and second wellbores are the same wellbore.

31. The method of claim 29, wherein the industrial process comprises a fossil fuel power plant and the one or more products or services comprise electricity.

32. The method of claim 29, wherein the industrial process comprises at least one of a natural gas processing facility, a steel production facility, a cement production facility, an industrial oxyfuel combustion process, a hydrogen production process, or a fertilizer production process.

33. The method of claim 29, further comprising:
receiving at least a portion of the injected carbon dioxide fluid from the first wellbore at the terranean surface within the hydrocarbon fluid;
separating the portion of the injected carbon dioxide fluid from the hydrocarbon fluid; and
re-injecting the separated portion of the injected carbon dioxide fluid into the first wellbore.

34. The method of claim 29, further comprising sequestering at least a portion of the injected carbon dioxide fluid in a subterranean zone.

35. The method of claim 29, the produced hydrocarbon fluid comprises the reduced life cycle carbon emissions intensity value, relative to a baseline life cycle carbon emissions intensity value, based on the injection of the carbon dioxide fluid produced from the industrial process.

36. A method for providing hydrocarbon fluid, comprising:
receiving a hydrocarbon fluid produced from a geologic formation into which a fluid that contains carbon dioxide captured from an industrial process that supplies one or more products or services is injected;

determining that the hydrocarbon fluid comprises a reduced life cycle carbon emissions intensity value based on its association with at least one of the carbon dioxide captured from the industrial process or the industrial process that supplies the one or more products or services; and providing the hydrocarbon fluid as a product.

37. The method of claim 36, further comprising completing a transaction to effect at least one of:

selling the hydrocarbon fluid to a hydrocarbon fluid refiner;

selling an emissions credit associated with a carbon intensity reduction to a transportation fuel provider or credit trading entity; or submitting an emissions credit associated with a carbon intensity reduction to a regulatory agency that regulates fuel carbon intensity.

38. The method of claim 36, wherein the industrial process comprises a basis for at least one of a carbon intensity reductions or an emissions credit for at least one of the raw hydrocarbon fluid or the fuel refined from the raw hydrocarbon fluid.

39. The method of claim 36, wherein the industrial process comprises at least one of an industrial separation process, a post-combustion separation process, a pre-combustion separation process, or an oxyfuel separation process.

40. The method of claim 36, wherein the industrial process comprises a fossil fuel power plant and the one or more products or services comprise electricity.

41. The method of claim 36, wherein the industrial process comprises at least one of a natural gas processing facility, a steel production facility, a cement production facility, an industrial oxyfuel combustion process, a hydrogen production process, or a fertilizer production process.

* * * * *